United States Patent
Park et al.

(10) Patent No.: US 11,523,374 B2
(45) Date of Patent: Dec. 6, 2022

(54) METHOD AND APPARATUS FOR TRANSMITTING AND RECEIVING DATA ON BASIS OF TONE PLAN IN WIRELESS LAN SYSTEM

(71) Applicant: LG ELECTRONICS INC., Seoul (KR)

(72) Inventors: Eunsung Park, Seoul (KR); Sunwoong Yun, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 17/253,868

(22) PCT Filed: Jun. 10, 2019

(86) PCT No.: PCT/KR2019/006924
§ 371 (c)(1),
(2) Date: Dec. 18, 2020

(87) PCT Pub. No.: WO2019/245203
PCT Pub. Date: Dec. 26, 2019

(65) Prior Publication Data
US 2021/0274484 A1 Sep. 2, 2021

(30) Foreign Application Priority Data
Jun. 20, 2018 (KR) .................. 10-2018-0071106

(51) Int. Cl.
*H04W 84/12* (2009.01)
*H04W 72/04* (2009.01)

(52) U.S. Cl.
CPC ........ *H04W 72/0406* (2013.01); *H04W 84/12* (2013.01)

(58) Field of Classification Search
CPC ...................................................... H04W 84/12
(Continued)

(56) References Cited

U.S. PATENT DOCUMENTS

2016/0330300 A1 11/2016 Josiam et al.
2017/0255659 A1 9/2017 Cariou et al.
(Continued)

OTHER PUBLICATIONS

PCT International Application No. PCT/KR2019/006924, International Search Report dated Sep. 16, 2019, 4 pages.
(Continued)

*Primary Examiner* — Dang T Ton
(74) *Attorney, Agent, or Firm* — Lee, Hong, Degerman, Kang & Waimey PC

(57) ABSTRACT

Proposed are a method and an apparatus for transmitting and receiving data to and from a wireless LAN system. Specifically, an AP transmits control information to an STA. The AP transmits data to or receives data from the STA on the basis of the control information. The control information includes RU information for transmitting and receiving data over a broadband network. If the broadband, on the basis of the RU information, is defined as only one full bandwidth, the RU information includes allocation information that the broadband consists of 12 guard tones, 3044-tone RU, 5 DC tones, and 11 guard tones. If the broadband, on the basis of the RU information, includes three 996-tone RUs, the RU information includes allocation information that the broadband consists of 12 guard tones, a first 996-tone RU, 1 null tone, 26-tone RU, 1 null tone, a second 996-tone RU, 1 null tone, 26-tone RU, 1 null tone, a third 996-tone RU, and 11 guard tones.

20 Claims, 19 Drawing Sheets

(58) Field of Classification Search
USPC .......................................................... 370/329
See application file for complete search history.

(56) References Cited

U.S. PATENT DOCUMENTS

| | | |
|---|---|---|
| 2017/0273083 A1 | 9/2017 | Chen et al. |
| 2018/0124788 A1 | 5/2018 | Choi et al. |
| 2021/0399864 A1* | 12/2021 | Lim ..................... H04L 1/0025 |

OTHER PUBLICATIONS

Laurent Cariou et al., "Extreme Throughput (XT) 802.11". IEEE 802.11-18/0789r10, dated May 10, 2018, 15 pages.

* cited by examiner

FIG. 1
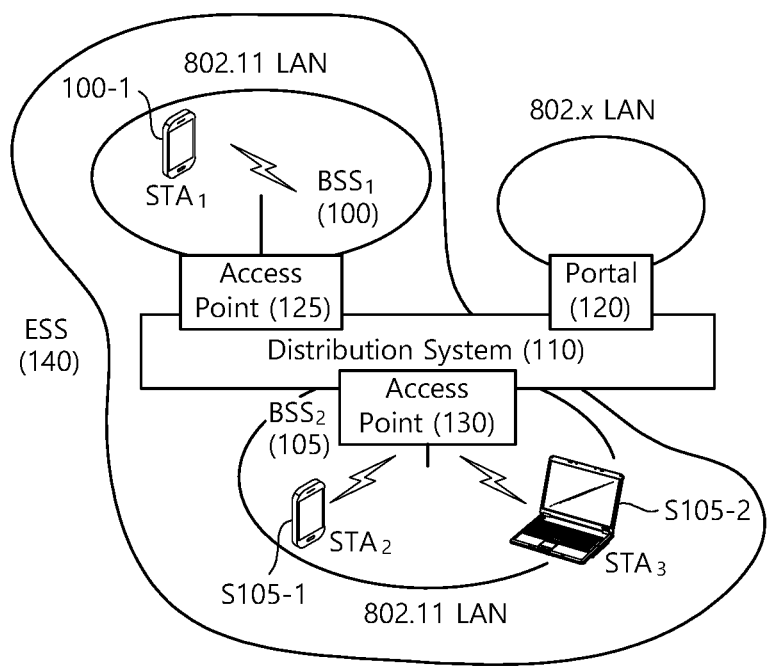
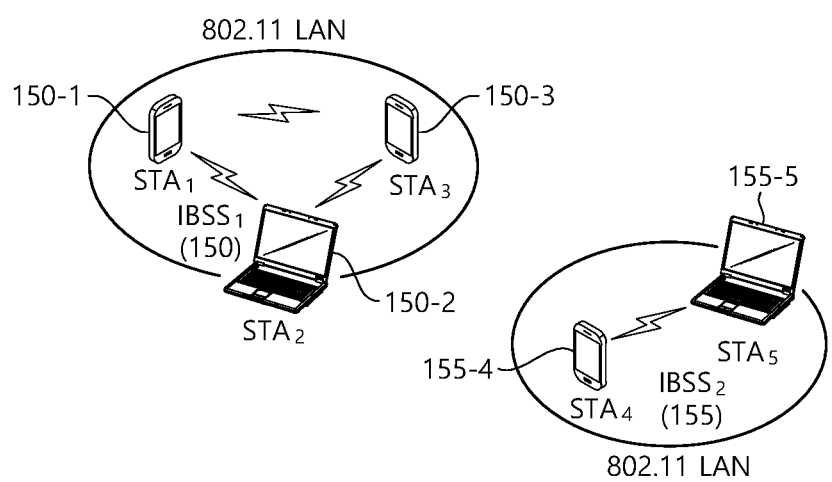

METHOD AND APPARATUS FOR TRANSMITTING AND RECEIVING DATA ON BASIS OF TONE PLAN IN WIRELESS LAN SYSTEM

CROSS-REFERENCE TO RELATED APPLICATIONS

This application is the National Stage filing under 35 U.S.C. 371 of International Application No. PCT/KR2019/006924, filed on Jun. 10, 2019, which claims the benefit of earlier filing date and right of priority to Korean Application No. 10-2018-0071106, filed on Jun. 20, 2018, the contents of which are all hereby incorporated by reference herein in their entirety.

BACKGROUND

Field

The present disclosure relates to a technique for configuring a tone plan in a wireless local area network (WLAN) system and, more particularly, to a method and a device for transmitting a pilot tone using a tone plan in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure proposes a method and a device for transmitting and receiving data based on a tone plan in a wireless local area network (WLAN) system.

An embodiment of the present disclosure proposes a method for transmitting and receiving data based on a tone plan.

The embodiment may be performed in a network environment supporting a next-generation WLAN system. The next-generation WLAN system may be a WLAN system evolving from an 802.11ax system and may satisfy backward compatibility with the 802.11ax system.

The embodiment may be performed by a transmission device, and the transmission device may correspond to an AP. In the embodiment, a reception device may correspond to a STA (non-AP STA).

The access point (AP) transmits control information to a station (STA).

The AP transmits data to the STA or receives data from the STA based on the control information.

The control information includes resource unit (RU) information for transmitting and receiving the data in a broadband. That is, the RU information may be considered to include scheduling information about the data for the STA (information about an RU configuration used for actual data transmission in the broadband). The STA may decode the RU information and may transmit or receive the data in RUs. The broadband may be 160 MHz, 240 MHz, or 320 MHz but is limited to 240 MHz in this embodiment.

When the broadband is defined as only a single full bandwidth based on the RU information, the RU information includes allocation information on that the broadband includes 12 guard tones, a 3044-tone RU, five DC tones, and 11 guard tones. That is, the RU information is tone plan information about the full bandwidth of the broadband. The allocation information is an example, and the RU information may include allocation information about various RU configurations for actually transmitting data. When a tone plan for the full bandwidth of the broadband is used, SU transmission may be performed, and when MU MIMO is applied to the full bandwidth, MU transmission may be performed.

When the broadband includes three 996-tone RUs based on the RU information, the RU information includes allocation information on that the broadband includes 12 guard tones, a first 996-tone RU, one null tone, a 26-tone RU, one null tone, a second 996-tone RU, one null tone, a 26-tone RU, one null tone, a third 996-tone RU, and 11 guard tones. That is, the RU information is tone plan information on that orthogonal frequency division multiple access (OFDMA) is applied to the broadband. The allocation information is an example, and the RU information may include allocation information about various RU configurations for actually transmitting data. When a tone plan in which OFDMA is applied to the broadband is used, the STA is one or more STAs (SU transmission or MU transmission).

When the RU information is the tone plan information about the full bandwidth of the broadband, a tone plan for the broadband is as follows. The broadband may sequentially include 12 guard tones, a 3044-tone RU, five DC tones, and 11 guard tones. The five DC tones may be disposed in the middle of the broadband.

The 3044-tone RU is an RU including 3044 tones. Tone indices for the 3044-tone RU are −1524 to −3 and 3 to 1524. The data may be transmitted or received through the 3044-tone RU.

When the RU information is the tone plan information on that OFDMA is applied to the broadband, a tone plan for the broadband is as follows. The broadband may sequentially include 12 guard tones, a first 996-tone RU, one null tone, a 26-tone RU, one null tone, a second 996-tone RU, one null tone, a 26-tone RU, one null tone, a third 996-tone RU, and 11 guard tones.

The first to third 996-tone RUs are RUs including 996 tones. The first and third 996-tone RUs may be allocated on both ends of the broadband, and the second 996-tone RU may be allocated in the middle of the broadband.

The first and third 996-tone RUs may include a 484-tone RU, one null tone, a 26-tone RU, one null tone, and a 484-tone RU. The second 996-tone RU may include a 484-tone RU, a 13-tone RU, seven DC tones, a 13-tone RU, and a 484-tone RU.

The 484-tone RU is an RU including 484 tones. The 484-tone RU may include a 242-tone RU and a 242-tone RU.

The 242-tone RU is an RU including 242 tones. The 242-tone RU may include one null tone, a 106-tone RU, one null tone, a 26-tone RU, one null tone, a 106-tone RU, and one null tone.

The 106-tone RU is an RU including 106 tones. The 106-tone RU may include a 52-tone RU, one null tone, and a 52-tone RU.

The 52-tone RU is an RU including 52 tones. The 52-tone RU may include a 26-tone RU and a 26-tone RU. The 26-tone RU may be an RU in a minimum unit including 26 tones.

In the tone plan in which OFDMA is applied to the broadband, the data may be transmitted or received through the first to third 996-tone RUs, the 484-tone RU, the 242-tone RU, the 106-tone RU, the 52-tone RU, or the 26-tone RU. That is, the data may be transmitted or received through the 996-tone RU or an RU (the 484-tone RU, the 242-tone RU, the 106-tone RU, the 52-tone RU, or the 26-tone RU) having a smaller number of tones than included in the 996-tone RU.

The AP may generate a physical protocol data unit (PPDU).

The PPDU may include a legacy preamble, an extremely high throughput (EHT)-signal (SIG)-A, an EHT-SIG-B, an EHT-LTF, an EHT-short training field (STF), and a data field. The EHT-SIG-B may include the RU information. That is, the AP may indicate information about a tone plan for the broadband through the EHT-SIG-B in the PPDU.

The data field includes a pilot tone. A specific pilot sequence may be inserted into the pilot tone.

The pilot tone is configured based on the RU information.

A specific operation of generating the PPDU is described as follows. First, the AP may configure the PPDU in the order of the legacy preamble, the EHT-SIG-A, the EHT-SIG-B, the EHT-STF, the EHT-LTF, and the data field. The AP may configure the RU information in the EHT-SIG-B and may configure the pilot tone. The AP may insert the specific pilot sequence into the pilot tone and may transmit the pilot tone to the STA.

When the broadband includes three 996-tone RUs based on the RU information, an index for the pilot tone may be set to ±{24, 92, 158, 226, 266, 334, 400, 468, 536, 604, 670, 738, 778, 846, 912, 980, 1074, 1142, 1208, 1276, 1316, 1384, 1450, 1518}.

When the broadband is defined as only a single full bandwidth based on the RU information, an index for the pilot tone may be set to ±{24, 158, 266, 400, 536, 670, 778, 912, 1074, 1208, 1316, 1450}.

When the broadband includes six 484-tone RUs, 12 242-tone RUs, or 24 106-tone RUs based on the RU information, an index for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518}.

When the broadband includes 48 52-tone RUs based on the RU information, an index for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518}.

When the broadband includes 96 26-tone RUs based on the RU information, an index for the pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518}.

The index for the pilot tone may be an even number, because 1x/2xLTF is considered When the broadband includes the 96 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the three 996-tone RUs based on the RU information, the pilot tones may be partially selected from pilot tones configured when the broadband includes the six 484-tone RUs. For example, half the pilot tones configured when the broadband includes the six 484-tone RUs may be used by alternately selecting the pilot tones.

When the broadband is defined as only the single full bandwidth based on the RU information, the pilot tones may be partially selected from pilot tones configured when the broadband includes the three 996-tone RUs. For example, half the pilot tones configured when the broadband includes the three 996-tone RUs may be used by alternately selecting the pilot tones.

The EHT-LTF may include the pilot tone. That is, the EHT-STF, the EHT-LTF, and the data field in the PPDU may be transmitted in a band (RU) according to the tone plan for the broadband.

The present disclosure proposes a technique for configuring a tone plan for a broadband in a WLAN system. According to an embodiment proposed in the present disclosure, a resource unit may be allocated based on a proposed tone plan to schedule downlink transmission or uplink transmission, thereby achieving efficiency in a subcarrier and high throughput.

The present disclosure proposes a technique for configuring a pilot tone in a broadband in a WLAN system. According to an embodiment proposed in the present disclosure, a pilot tone may be allocated based on a proposed tone plan to improve performance in CFO estimation, thereby achieving efficiency in a subcarrier and high throughput.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
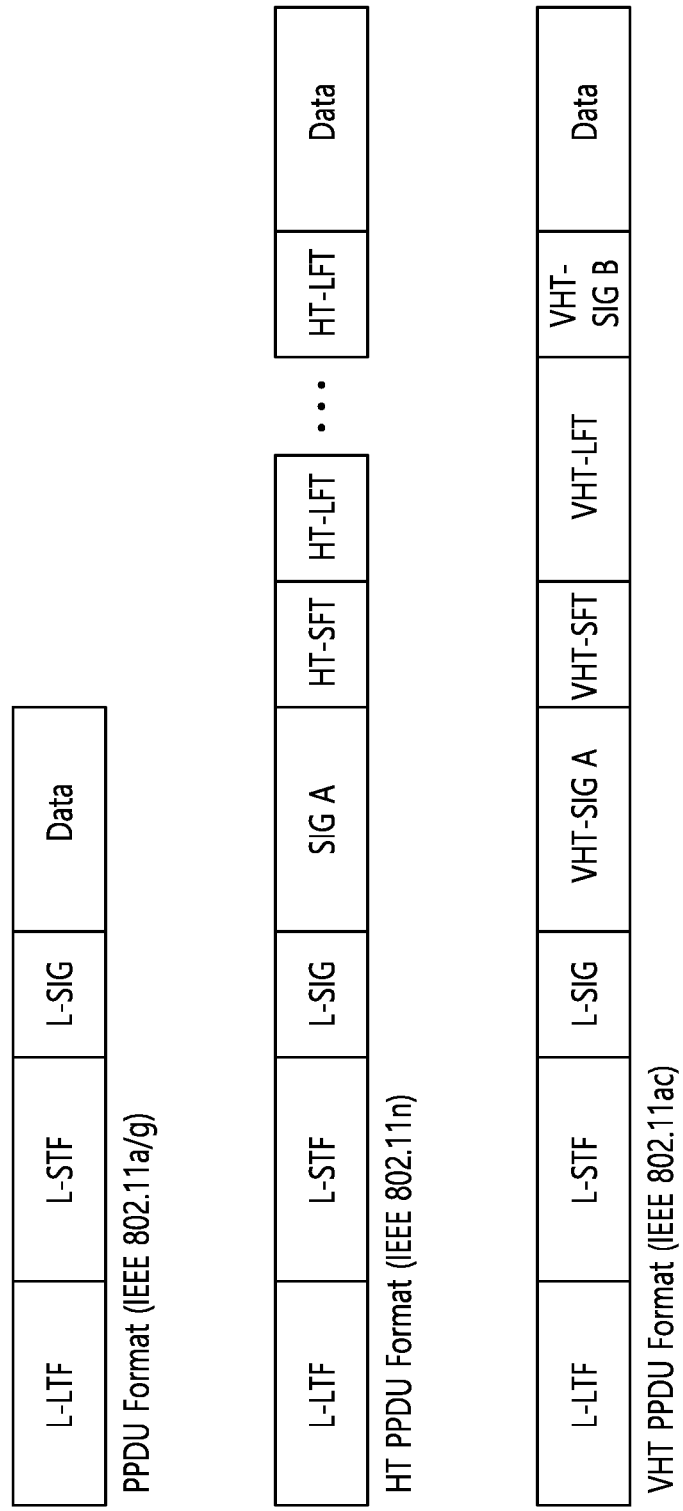
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
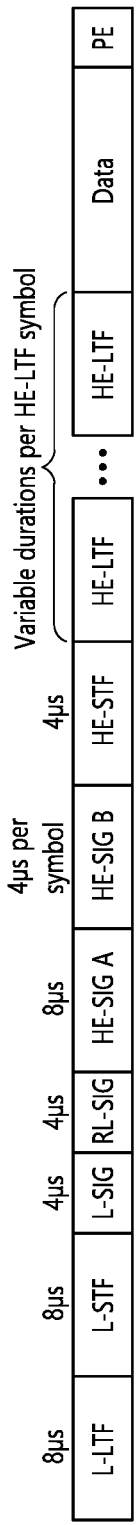
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8/Ls).

More detailed description of the respective fields of FIG. 3 will be made below.

Figure 4:
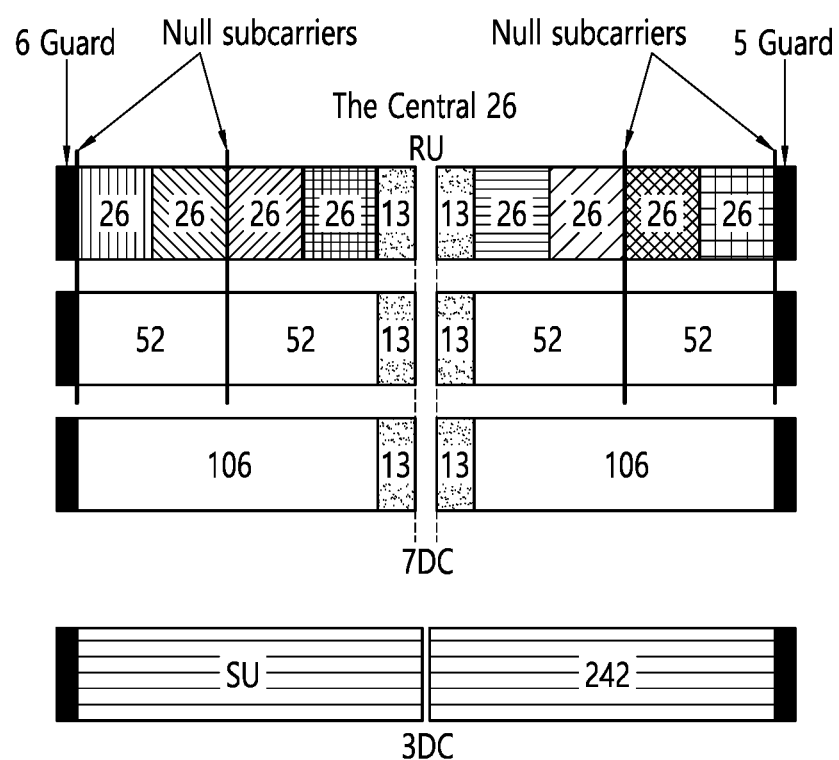
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
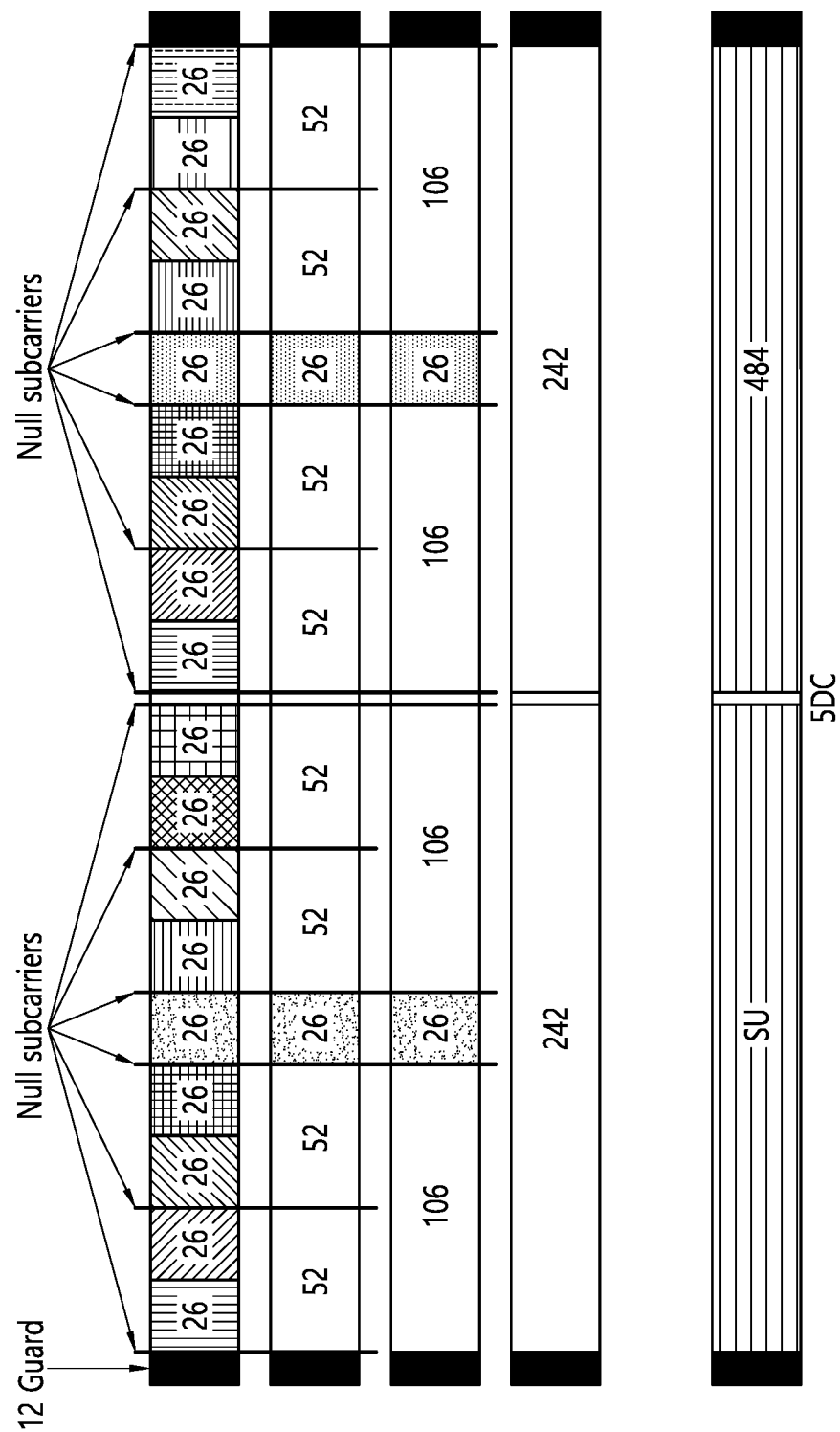
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
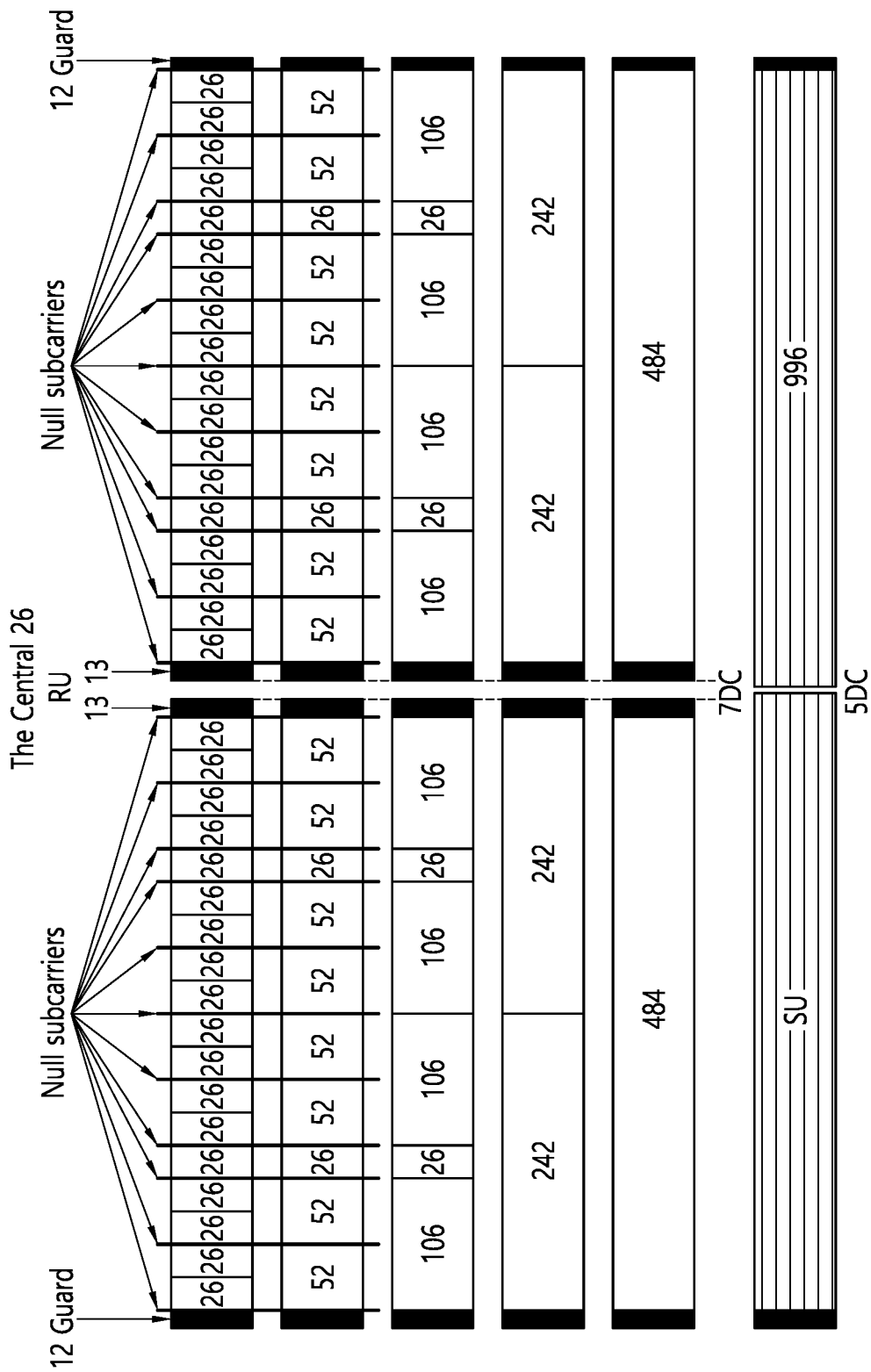
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
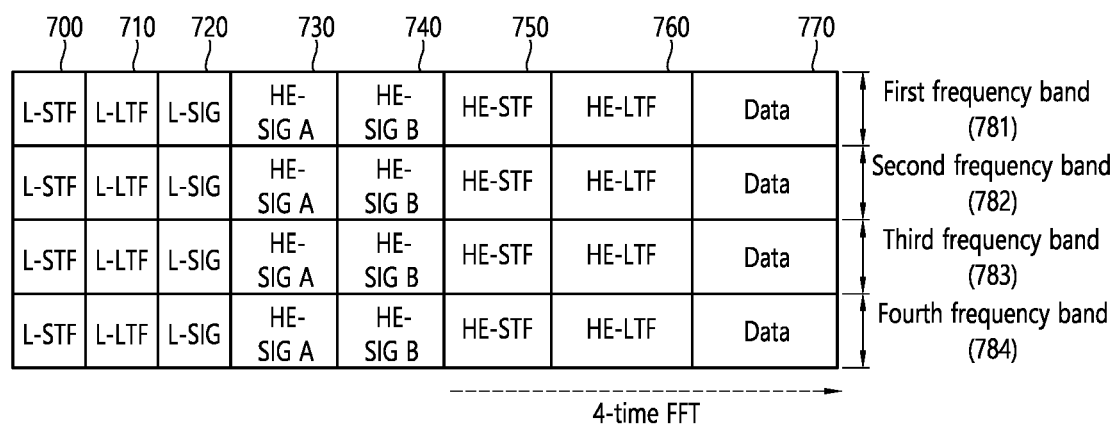
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTF size. Set to 0 to indicate a 1x HE-LTF and 0.8 μs GI Set to 1 to indicate a 2x HE-LTF and 0.8 μs GI Set to 2 to indicate a 2x HE-LTF and 1.6 μs GI Set to 3 to indicate: a 4x HE-LTF and 0.8 μs GI if both the DCM and STBC fields are 1. Neither DCM nor STBC shall be applied if(#Ed) both the DCM and STBC fields are set to 1. a 4x HE-LTF and 3.2 μs GI, otherwise |

TABLE 1-continued

| Two Parts of HE-SIG-A | Bit | Field | Number of bits | Description |
|---|---|---|---|---|
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if(#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION - 512)/128)(#16277).<br>where(#16061)<br>B0 indicates the TXOP length granularity. Set to 0 for 8 µs; otherwise set to 1 for 128 µs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beam-formed(#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (sec 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.(#16805) NOTE-The TDLS peer can identify the TDLS frame by To DS and From DS fields in the MAC header of the MPDU. |
| | B1-B3 | SIGB MCS | 3 | Indicates the MCS of the HE-SIG-B field: Set to 0 for MCS 0 Set to 1 for MCS 1 Set to 2 for MCS 2 Set to 3 for MCS 3 Set to 4 for MCS 4 Set to 5 for MCS 5 The values 6 and 7 are reserved |
| | B4 | SIGB DCM | 1 | Set to 1 indicates that the HE-SIG-B is modulated with DCM for the MCS. Set to 0 indicates that the HE-SIG-B is not modulated with DCM for the MCS. NOTE-DCM is only applicable to MCS 0, MCS 1, MCS 3, and MCS 4. |
| | B5-B10 | BSS Color | 6 | The BSS Color field is an identifier of the BSS. Set to the value of the TXVECTOR parameter BSS_-COLOR. |
| | B11-B14 | Spatial Reuse | 4 | Indicates whether or not spatial reuse is allowed during the transmission of this PPDU(#16806). Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz sub-channels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without |

TABLE 2-continued

| Two Parts of HE-SIG-A | Bit | Field | Number of bits | Description |
|---|---|---|---|---|
| | | | | DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present. Set to 1 if the Common field in HE-SIG-B is not present.(#16139) |
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x HE-LTF and 3.2 μs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION - 512)/128)(#16377). where(#16061) B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1(#15498), B8-B9 indicates the number of HE-LTF symbols(#16056) and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation.(#15661) |
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 |

TABLE 2-continued

| Two Parts of HE-SIG-A | Bit | Field | Number of bits | Description |
|---|---|---|---|---|
| | | | | Set to 2 to indicate a pre-FEC padding factor of 2 Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_-COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR. which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP- |

TABLE 3-continued

| Two Parts of HE-SIG-A | Bit | Field | Number of bits | Description |
|---|---|---|---|---|
| | | | | based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>If(#Ed) the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If(#Ed) the STA operating channel width is 80 + 80 MHz, this field is set to the same value as Spatial Reuse 1 field.<br>Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If(#Ed) the STA operating channel width is 20 MHz, then this field is set to the same value as Spatial Reuse 1 field.<br>If(#Ed) the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If(#Ed) the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz<br>Set to 1 for 40 MHz<br>Set to 2 for 80 MHz<br>Set to 3 for 160 MHz and 80 + 80 MHz |

TABLE 3-continued

| Two Parts of HE-SIG-A | Bit | Field | Number of bits | Description |
|---|---|---|---|---|
| HE-SIG-A2 | B0-B6 | TXOP | 7 | Set to 127 to indicate no duration information if(#15499) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION - 512)/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
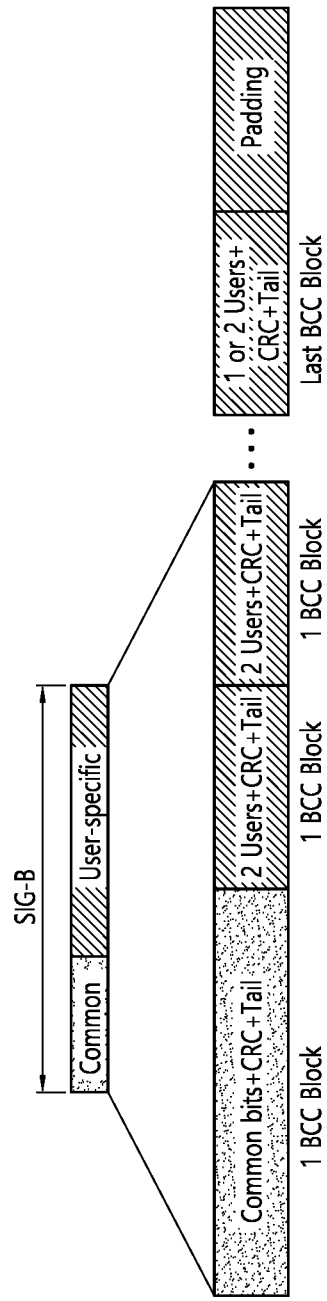
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 us and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
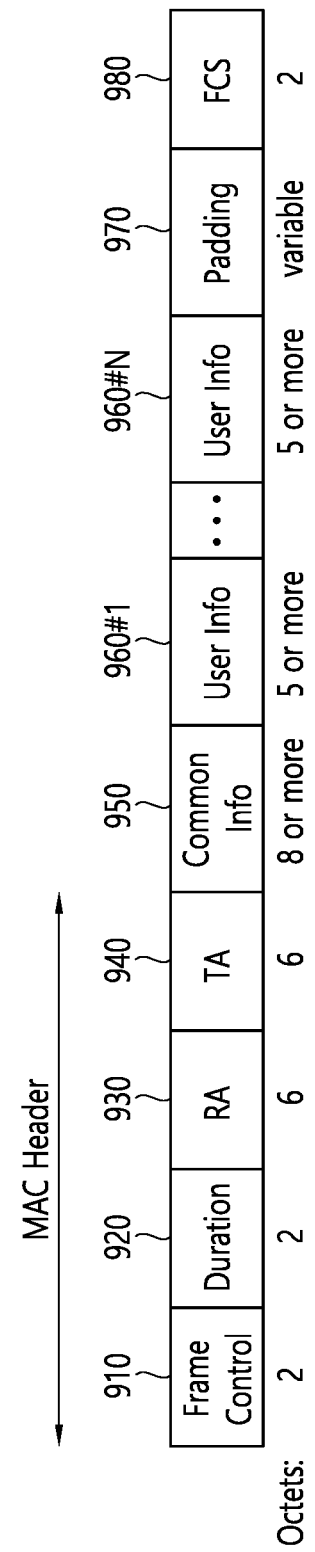
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
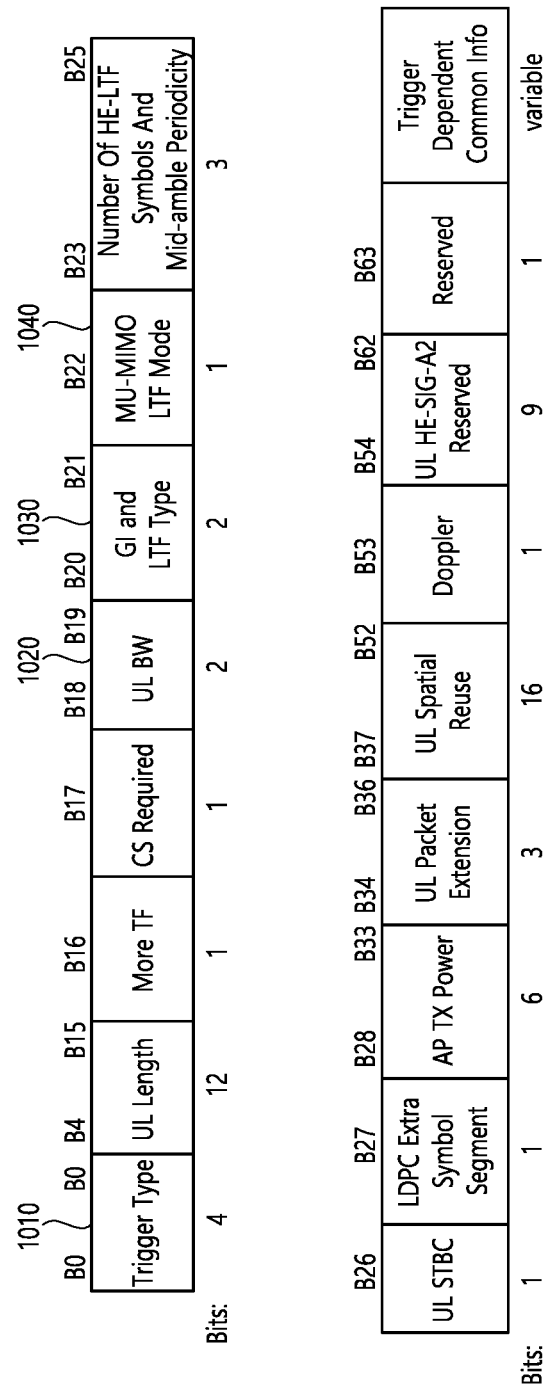
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
| --- | --- |
| 0 | 1x HE-LTF + 1.6 μs GI |
| 1 | 2x HE-LTF + 1.6 μs GI |
| 2 | 4x HE-LTF + 3.2 μs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
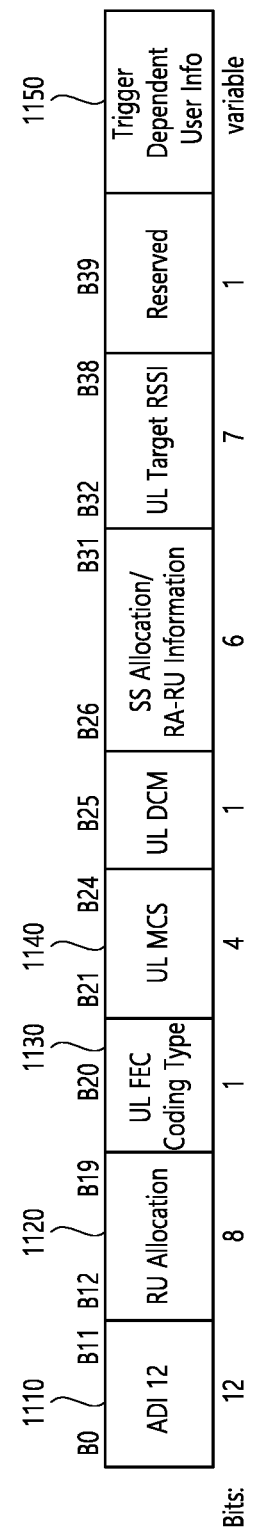
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
| --- | --- | --- | --- | --- | --- | --- | --- | --- | --- | --- |
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 26 | 52 | | 26 | 26 | 26 | 26 | 1 |
| 00000101 | 26 | 26 | 26 | 52 | | 26 | 26 | 52 | | 1 |
| 00000110 | 26 | 26 | 26 | 52 | | 26 | 52 | | 26 | 26 | 1 |
| 00000111 | 26 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | | 106 | | | 8 |
| 00011$y_2y_1y_0$ | | 106 | | | — | 52 | | 52 | | 8 |
| 00100$y_2y_1y_0$ | 26 | 26 | 26 | 26 | 26 | | 106 | | | 8 |
| 00101$y_2y_1y_0$ | 26 | 26 | | 52 | | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_1y_0z_1z_0$ | | 106 | | | — | | 106 | | | 16 |
| 01110000 | 52 | | 52 | | — | 52 | | 52 | | 1 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01110001 | | | | 242-tone RU empty | | | | | | 1 |
| 01110010 | | | | 484-tone RU with zero User fields indicated in this RU Allocation subfield of the HE-SIG-B content channel | | | | | | 1 |
| 01110011 | | | | 996-tone RU with zero User fields indicated in this RU Allocation subfield of the HE-SIG-B content channel | | | | | | 1 |
| 011101$x_1x_0$ | | | | Reserved | | | | | | 4 |
| 01111$y_2y_1y_0$ | | | | Reserved | | | | | | 8 |
| 10$y_2y_1y_0z_2z_1z_0$ | | 106 | | 26 | | | 106 | | | 64 |
| 11000$y_2y_1y_0$ | | | | 242 | | | | | | 8 |
| 11001$y_2y_1y_0$ | | | | 484 | | | | | | 8 |
| 11010$y_2y_1y_0$ | | | | 996 | | | | | | 8 |
| 11011$y_2y_1y_0$ | | | | Reserved | | | | | | 8 |
| 111$x_4x_3x_2x_1x_0$ | | | | Reserved | | | | | | 32 |

If (#ED) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000–111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000–111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$=00000-11111.
"—" means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
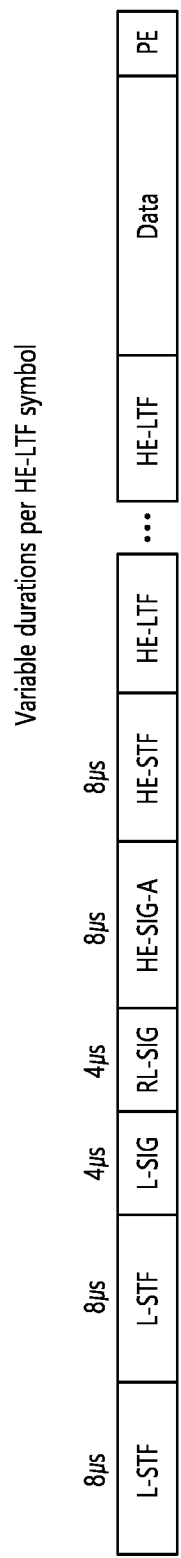
FIG. 12 illustrates an example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

The PPDU may not include the HE-SIG-B field but only the HE-SIG-A field.

Subcarrier and resource allocation in an 802.11ax system will be described.

An OFDM symbol includes subcarriers, and the number of subcarriers may function as the bandwidth of a PPDU. In the 802.11 WLAN system, a data subcarrier used for data transmission, a pilot subcarrier used for phase information and parameter tracking, and an unused subcarrier unoccupied for data transmission and pilot transmission are defined.

A HE MU PPDU using OFDMA transmission may be transmitted via a combination of a 26-tone RU, a 52-tone RU, a 106-tone RU, a 242-tone RU, a 484-tone RU, and a 996-tone RU.

The 26-tone RU includes 24 data subcarriers and two pilot subcarriers. The 52-tone RU includes 48 data subcarriers and four pilot subcarriers. The 106-tone RU includes 102 data subcarriers and four pilot subcarriers. The 242-tone RU includes 234 data subcarriers and 8 pilot subcarriers. The 484-tone RU includes 468 data subcarriers and 16 pilot subcarriers. The 996-tone RU includes 980 data subcarriers and 16 pilot subcarriers.

When a pilot subcarrier is present in a HE-LTF field of a HE SU PPDU, a HE MU PPDU, a HE ER SU PPDU, or a HE TB PPDU, the position of a pilot sequence in the HE-LTF field and a data field may be the same as the position is a 4×HE-LTF. In a 1×HE-LTF, the position of a pilot sequence in a HE-LTF includes pilot subcarriers for a quadrupled data field. When a pilot subcarrier exists in a 2×HE-LTF, the position of the pilot subcarrier needs to be the same as the position of a pilot in a 4× data symbol. All pilot subcarriers are positioned at even-numbered indices listed in the following table.

Tone plans for full-band and OFDMA transmissions in 20/40/80/80+80/160 MHz are designed in existing 11ax, and the present disclosure additionally proposes a 240 MHz tone plan.

1. New 160 MHz Tone Plan
1. 240 MHz Tone Plan

An AP may transmit a PPDU using a bandwidth of 240 MHz, and a 240 MHz tone plan may be configured by combining three existing 11ax 80 MHz tone plans. Here, the 240 MHz tone plan may be configured as follows considering both contiguous and noncontiguous bands: 80+80+80 MHz/160+80 MHz/80+160 MHz/240 MHz.

+ denotes noncontiguous, and 160/240 denotes a contiguous arrangement of two/three 80 MHz tone plans.

<Case of Including Contiguous Band>

When 160 MHz is used, tone indices in a left 80 MHz tone plan are the tone indices in the existing 80 MHz tone plan −512, and tone indices in a right 80 MHz tone plan are the tone indices in the existing 80 MHz tone plan+512.

When 240 MHz is used, tone indices in a middle 80 MHz tone plan are the same tone indices in the existing 80 MHz tone plan, tone indices in a left 80 MHz tone plan are the tone indices in the existing 80 MHz tone plan −1024, and tone indices in a right 80 MHz tone plan are the tone indices in the existing 80 MHz tone plan+1024.

A pilot subcarrier also needs to be adjusted corresponding to the position. When 160 MHz is used, pilot tone indices in a left 80 MHz tone plan are the pilot tone indices in the existing 80 MHz tone plan −512, and pilot tone indices in a right 80 MHz tone plan are the pilot tone indices in the existing 80 MHz tone plan+512.

TABLE 11

| Channel Width | RU Size | Pilot Subcarrier Indices |
|---|---|---|
| 20 MHz | 26, 52 | ±10, ±22, ±36, ±48, ±62, ±76, ±90, ±102, ±116 |
|  | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
|  | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |
|  | 106, 242, 484 | ±24, ±50, ±92, ±118, ±158, ±184, ±226, ±252, ±266, ±292, ±334, ±360, ±400, ±426, ±468, ±494 |
|  | 996 | ±24, ±92, ±158, ±226, ±266, ±334, ±400, ±468 |
| 160 MHz | 26, 52, 106, 242, 484 | {pilot subcarrier indices in 80 MHz −512, pilot subcarrier indices in 80 MHz +512} |
|  | 996 | {for the lower 80 MHz, pilot subcarrier indices in 80 MHz −512, for the upper 80 MHz, pilot subcarrier indices in 80 MHz +512} |

In 160 MHz or 80+80 MHz, the position of a pilot subcarrier needs to use the same 80 MHz position for 80 MHz on either side.

The present disclosure proposes a tone plan and a pilot carrier in a case where a wide bandwidth of 240 MHz is used in a WLAN system (802.11).

In the 802.11 WLAN system, transmission of an increased stream using a wider band than that in existing 11ax or using more antennas than those in 11ax is taken into consideration in order to increase peak throughput. In addition, a method of aggregating various bands for use is also taken into consideration.

The present disclosure considers using a wide band and particularly proposes a tone plan and a pilot carrier in a case where 240 MHz is used.

When 240 MHz is used, pilot tone indices in a middle 80 MHz tone plan are the same pilot tone indices in the existing 80 MHz tone plan, pilot tone indices in a left 80 MHz tone plan are the pilot tone indices in the existing 80 MHz tone plan −1024, and pilot tone indices in a right 80 MHz tone plan are the pilot tone indices in the existing 80 MHz tone plan+1024.

Alternatively, when the existing 11ax 80 MHz tone plan and the new 160 MHz tone plan may be used and both a contiguous band and a noncontiguous band are considered, a tone plan may be represented as follows.

c80+n160 MHz/n160 MHz+c80/nc240 MHz/cn240 MHz

+ denotes noncontiguous, and c80 MHz and n160 MHz denote the existing 11ax 80 MHz tone plan and the new 160 MHz tone plan, respectively. nc240 MHz/cn240 MHz denote one new 160 MHz tone plan and one existing 11ax 80 MHz tone plan which are contiguous, and nc/cn denotes the order in which the tone plans are contiguous.

When nc240 MHz is used, tone indices in a left 160 MHz tone plan are the tone indices in the new 160 MHz tone plan −512, and tone indices in a right 80 MHz tone plan are the tone indices in the existing 80 MHz tone plan+1024.

When cn240 MHz is used, tone indices in a left 80 MHz tone plan are the tone indices in the existing 80 MHz tone plan −1024, and tone indices in a right 160 MHz tone plan are the tone indices in the new 160 MHz tone plan+512.

A pilot subcarrier also needs to be adjusted corresponding to the position. When nc240 MHz is used, pilot tone indices in a left 160 MHz tone plan are the pilot tone indices in the new 160 MHz tone plan −512, and pilot tone indices in a right 80 MHz tone plan are the pilot tone indices in the existing 80 MHz tone plan+1024.

When cn240 MHz is used, pilot tone indices in a left 80 MHz tone plan are the pilot tone indices in the existing 80 MHz tone plan −1024, and pilot tone indices in a right 160 MHz tone plan are the pilot tone indices in the new 160 MHz tone plan+512.

In the above various noncontiguous combinations, not only the same band but also different bands may be used. For example, in 80+80+80 MHz, each 80 MHz bandwidth may be transmitted using a 2.4 GH/5 GHz/6 GHz band.

Specifically, there may be three options to configure a 240 MHz tone plan.

Option 1: Combination of three 80 MHz tone plans (80+80+80)

Option 2: Combination of two 80 MHz tone plans and one new 160 MHz tone plan (160+80/80+160)

Option 3: Alternative 240 MHz tone plan (240)

In a noncontiguous case, different bands may be used. Indices for RU subcarriers may be adjusted according to position.

Indices for 240 MHz pilot subcarriers may be adjusted according to position as follows.

160 MHz: Existing 80 MHz±512 (same as in RU tone indices)

240 MHz: Existing 80 MHz±1024, existing 80 MHz (same as in RU tone indices), new 160 MHz±512 (same as in RU tone indices)

Tone Plan 1

When the full band is used, a new RU may be proposed in consideration of a guard tone and a DC tone. In existing 11ax 80 MHz and 160 MHz, 12 right guard tones and 11 left guard tones are used, which may equally be used in 240 MHz. Considering actual interference from an adjacent channel or interference in an adjacent channel, 12 right guard tones and 11 left guard tones may be used. Further, it is needed to use DC tones in number equal to or greater than the number of DC tones used in existing 80 MHz, which is five or seven, and five or seven DC tones may be used in consideration of a DC offset. Accordingly, the following tone plans may be proposed. In the following tone plans, G denotes a guard tone, and N denotes a null tone.

1. Alternative 240 MHz Tone Plan 1

<Full Band Tone Plan>

12/11 guard, DC 5 or 7, RU 3044 or 3042

<OFMDA Tone Plan>

12G+996RU+1N+26RU+1N+996RU (5DC)+1N+26RU+1N+996RU+11G

Either 996RU=484RU+1N+26RU+1N+484RU (ver1) (or 1N+484RU+26RU+484RU+1N (ver2))

Middle 996RU (5DC)=484RU+13RU+7DC+13RU+484RU (same as in 80 MHz)

484RU=242RU+242RU

242RU=1N+106RU+1N+26RU+1N+106RU+1N

106RU=52RU+2N+52RU

52RU=26RU+26RU

In the full band, five or seven DC tones are configured in consideration of the impact of a DC offset. The number of DC tones cannot be less than that in 80 MHz/160 MHz and may not be greater than seven in OFDMA.

The two options of the configuration of either 996 RU may be considered to secure the performance of the 26 RU or performance of the 484 RU. The configurations of the middle 996 RU and the remaining RUs are the same as those in existing ax.

Specifically, two configurations may be proposed for either 996 RU, among which a first configuration has a null tone disposed on either side of a 26 RU to reduce the impact of interference from/in an adjacent RU, and a second configuration can reduce the impact of interference between a 484 RU and an RU adjacent thereto. An RU using a small number of subcarriers, such as a 26 RU, may preferably use the first configuration since interference significantly affects performance.

The middle 996 RU may employ the same 996 RU tone plan as in existing 80 MHz. Further, the 484/242/106/52 RUs may employ the same configurations as in existing 11ax.

Listed below are tone indices for each RU and null tone indices in a case where the first configuration is used for either 996 RU.

<26 RU>

TABLE 12

| RU1 | RU2 | RU3 | RU4 |
|---|---|---|---|
| −1523:−1498 | −1497:−1472 | −1469:−1444 | −1443:−1418 |
| RU5 | RU6 | RU7 | RU8 |
| −1416:−1391 | −1389:−1364 | −1363:−1338 | −1335:−1310 |
| RU9 | RU10 | RU11 | RU12 |
| −1309:−1284 | −1281:−1256 | −1255:−1230 | −1227:−1202 |
| RU13 | RU14 | RU15 | RU16 |
| −1201:−1176 | −1174:−1149 | −1147:−1122 | −1121:−1096 |
| RU17 | RU18 | RU19 | RU20 |
| −1093:−1068 | −1067:−1042 | −1039:−1014 | −1011:−960 |
| RU21 | RU2 | RU23 | RU24 |
| −985:−986 | −957:−932 | −931:−906 | −904:−879 |
| RU25 | RU26 | RU27 | RU28 |
| −877:−852 | −851:−826 | −823:−798 | −797:−772 |
| RU29 | RU30 | RU31 | RU32 |
| −769:−744 | −743:−718 | −715:−690 | −689:−664 |
| RU33 | RU34 | RU35 | RU36 |
| −662:−637 | −635:−610 | −609:−584 | −581:−556 |
| RU37 | RU38 | RU39 | RU40 |
| −555:−530 | −527:−502 | −499:−474 | −473:−448 |
| RU41 | RU42 | RU43 | RU44 |
| −445:−420 | −419:−394 | −392:−367 | −365:−340 |
| RU45 | RU46 | RU47 | RU48 |
| −339:−314 | −311:−286 | −285:−260 | −257:−232 |
| RU49 | RU50 | RU51 | RU52 |
| −231:−206 | −203:−178 | −177:−152 | −150:−125 |
| RU53 | RU54 | RU55 | RU56 |
| −123:−98 | −97:−72 | −69:−44 | −43:−18 |
| RU57 | | | |
| −16:−4, 4:16 | | | |

RU 58 to RU 113→Subcarrier indices for RU 57+x are the same as subcarrier indices for RU 57−x multiplied by −1 (x is a positive integer that is less than or equal to 56)

→Ex) Subcarrier indices for RU 58 are the same as subcarriers indices for RU 56 multiplied by −1, that is, 18:43

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524}

<52 RU>

TABLE 13

| RU1 | RU2 | RU3 | RU4 |
|---|---|---|---|
| −1523:−1472 | −1469:−1418 | −1389:−1338 | −1335:−1284 |
| RU5 | RU6 | RU7 | RU8 |
| −1281:−1230 | −1227:−1176 | −1147:−1096 | −1093:−1042 |
| RU9 | RU10 | RU11 | RU12 |
| −1011:−960 | −957:−906 | −877:−826 | −823:−772 |
| RU13 | RU14 | RU15 | RU16 |
| −769:−718 | −715:−664 | −635:−584 | −581:−530 |
| RU17 | RU18 | RU19 | RU20 |
| −499:−448 | −445:−394 | −365:−314 | −311:−260 |
| RU21 | RU22 | RU23 | RU24 |
| −257:−206 | −203:−152 | −123:−72 | −69:−18 |

RU 25 to RU 48→Subcarrier indices for RU 24+x are the same as subcarrier indices for RU 25−x multiplied by −1 (x is a positive integer that is less than or equal to 24)

→Ex) Subcarrier indices for RU 26 are the same as subcarriers indices for RU 23 multiplied by −1, that is, 72:123

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524}

<106 RU>

TABLE 14

| RU1 | RU2 | RU3 | RU4 |
|---|---|---|---|
| −1523:−1418 | −1389:−1284 | −1281:−1176 | −1147:−1042 |
| RU5 | RU6 | RU7 | RU8 |
| −1011:−906 | −877:−772 | −769:−664 | −635:−530 |
| RU9 | RU10 | RU11 | RU12 |
| −499:−394 | −365:−260 | −257:−152 | −123:−18 |

RU 13 to RU 24→Subcarrier indices for RU 12+x are the same as subcarrier indices for RU 13−x multiplied by −1 (x is a positive integer that is less than or equal to 12)

→Ex) Subcarrier indices for RU 14 are the same as subcarriers indices for RU 11 multiplied by −1, that is, 152:257

Null subcarriers: ±{17, 124, 151, 258, 259, 366, 393, 500, 501, 528, 529, 636, 663, 770, 771, 878, 905, 1012, 1013, 1040, 1041, 1148, 1175, 1282, 1283, 1390, 1417, 1524}

<242 RU>

TABLE 15

| RU1 | RU2 | RU3 | RU4 |
|---|---|---|---|
| −1524:−1283 | −1282:−1041 | −1012:−771 | −770:−529 |
| RU5 | RU6 | | |
| −500:−259 | −258:−17 | | |

RU 7 to RU 12→Subcarrier indices for RU 6+x are the same as subcarrier indices for RU 7−x multiplied by −1 (x is a positive integer that is less than or equal to 6)

→Ex) Subcarrier indices for RU 8 are the same as subcarriers indices for RU 5 multiplied by −1, that is, 259:500

Null subcarriers: ±{501, 528, 1013, 1040}

<484 RU>

TABLE 16

| RU1 | RU2 | RU3 |
|---|---|---|
| −1524:−1041 | −1012:−529 | −500:−17 |

RU 5 to RU 8→Subcarrier indices for RU 3+x are the same as subcarrier indices for RU 4−x multiplied by −1 (x is a positive integer that is less than or equal to 3)

→Ex) Subcarrier indices for RU 5 are the same as subcarriers indices for RU 2 multiplied by −1, that is, 529:1012

Null subcarriers: ±{501, 528, 1013, 1040}

<996 RU>

TABLE 17

| RU1 | RU2 | RU3 |
|---|---|---|
| −1524:−529 | −500:−3, 3:500 | 529:1524 |

Null subcarriers: ±{501, 528}<3044 or 3042 RU>
3044RU: −1524:−3, 3:1524
3042RU: −1524:−4, 4:1524
Null subcarriers: X Pilot tones may be configured according to these tone plans, and tone indices may be unified based on the 26-RU pilot tone indices as in existing 11ax. In a 26-RU, tones with 26-RU tone indices having the sixth largest absolute value and the seventh smallest absolute value or having the seventh largest absolute value and the seventh smallest absolute value are configured as two pilot tones. In a 13+13 RU, a center tone of each 13 RU is configured as a pilot tone. In addition, it is preferable that an even-numbered tone is configured as a pilot tone in consideration of a 1×/2×LTF, and a configuration having an even-numbered tone is selected from among the two pilot configurations in the 26 RU. A pilot tone in the 52/106/242/484 RU may be configured using the existing method, and the same pilot tone as used for a 996 RU in existing 11ax 80 MHz may be used to configure the middle 996 RU. A subcarrier in either 996 RU and the full band may be configured with a pilot tone index by the following method. For reference, p3044v1 to 3, which are options for the full band, are not limited to a case of the full band using a 3044 RU but may be equally applied to a case of the full band using a 3042 RU. Further, p3044v1 to 3 may also be applied to a 3040/3038 RU proposed in tone plan 2.

<Middle 996 RU>
Same as pilot positions in 996 RU in existing 11ax 80 MHz
<Either 996 RU>
To select from among 484-RU pilots
P996v1: To alternately select from among subcarriers with subcarrier indices having a greater absolute value
P996v2: To alternately select from among subcarriers with subcarrier indices having a smaller absolute value
P996v3: To alternately select from among 996-RU tones from opposite ends to center
P996v4: To alternately select from among 996-RU tones from center to opposite ends
<Full Band>
To select from among 996-RU pilots
P3044v1: To use all 996-RU pilots (triple of number of 996-RU pilots, 48)
P3044v2: To alternately select from among edge tones (24 pilots)
P3044v3: To alternately select from among DC tones (24 pilots)

Among the above options, p996v3 and p3044v3 are methods applied to the pilot tone configuration of each RU in existing 11ax (p996v3 of alternately selecting tones from the opposite ends to the center is a method applied to the pilot configuration of a 106-RU, and p3044v3 of alternately selecting tones from the DC tones is a method applied to the pilot configuration of a 996-RU in a full band of 80 MHz). If there is no difference in the number of pilots between the options, using p996v3 and p3044v3 may be advantageous in design for unified pilots for extension to a wider band (a bandwidth of 320 MHz or greater will be considered to improve throughput) although there is no significant difference in performance in CFO estimation. Pilot subcarrier indices according to the above tone plans are listed below.

<26 RU>

±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518}

<52 RU>

±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518}

<106/242/484 RU>

±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518}

<996 RU/Full Band>

P996v1: ±{24, 92, 158, 226, 266, 334, 400, 468, 562, 630, 696, 764, 804, 872, 938, 1006, 1074, 1142, 1208, 1276, 1316, 1384, 1450, 1518}

P3044v1: ±{24, 92, 158, 226, 266, 334, 400, 468, 562, 630, 696, 764, 804, 872, 938, 1006, 1074, 1142, 1208, 1276, 1316, 1384, 1450, 1518}

P3044v2: ±{92, 226, 334, 468, 630, 764, 872, 1006, 1142, 1276, 1384, 1518}

P3044v3: ±{24, 158, 266, 400, 562, 696, 804, 938, 1074, 1208, 1316, 1450}

P996v2: ±{24, 92, 158, 226, 266, 334, 400, 468, 536, 604, 670, 738, 778, 846, 912, 980, 1048, 1116, 1182, 1250, 1290, 1358, 1424, 1492}

P3044v1: ±{24, 92, 158, 226, 266, 334, 400, 468, 536, 604, 670, 738, 778, 846, 912, 980, 1048, 1116, 1182, 1250, 1290, 1358, 1424, 1492}

P3044v2: ±{92, 226, 334, 468, 604, 738, 846, 980, 1116, 1250, 1358, 1492}

P3044v3: ±{24, 158, 266, 400, 536, 670, 778, 912, 1048, 1182, 1290, 1424}

P996v3: ±{24, 92, 158, 226, 266, 334, 400, 468, 536, 604, 670, 738, 778, 846, 912, 980, 1074, 1142, 1208, 1276, 1316, 1384, 1450, 1518}

P3044v1: ±{24, 92, 158, 226, 266, 334, 400, 468, 536, 604, 670, 738, 778, 846, 912, 980, 1074, 1142, 1208, 1276, 1316, 1384, 1450, 1518}

P3044v2: ±{92, 226, 334, 468, 604, 738, 846, 980, 1142, 1276, 1384, 1518}

P3044v3: ±{24, 158, 266, 400, 536, 670, 778, 912, 1074, 1208, 1316, 1450}

P996v4: ±{24, 92, 158, 226, 266, 334, 400, 468, 562, 630, 696, 764, 804, 872, 938, 1006, 1048, 1116, 1182, 1250, 1290, 1358, 1424, 1492}

P3044v1: ±{24, 92, 158, 226, 266, 334, 400, 468, 562, 630, 696, 764, 804, 872, 938, 1006, 1048, 1116, 1182, 1250, 1290, 1358, 1424, 1492}

P3044v2: ±{92, 226, 334, 468, 630, 764, 872, 1006, 1116, 1250, 1358, 1492}

P3044v3: ±{24, 158, 266, 400, 562, 696, 804, 938, 1048, 1182, 1290, 1424}

Listed below are tone indices for each RU and null tone indices in a case where the second configuration is used for either 996 RU.

<26 RU>

TABLE 18

| RU1 | RU2 | RU3 | RU4 |
|---|---|---|---|
| −1522:−1497 | −1496:−1471 | −1468:−1443 | −1442:−1417 |
| RU5 | RU6 | RU7 | RU8 |
| −1415:−1390 | −1388:−1363 | −1362:−1337 | −1334:−1309 |
| RU9 | RU10 | RU11 | RU12 |
| −1308:−1283 | −1280:−1255 | −1254:−1229 | −1226:−1201 |
| RU13 | RU14 | RU15 | RU16 |
| −1200:−1175 | −1173:−1148 | −1146:−1121 | −1120:−1095 |
| RU17 | RU18 | RU19 | RU20 |
| −1092:−1067 | −1066:−1041 | −1039:−1014 | −1012:−987 |
| RU21 | RU2 | RU23 | RU24 |
| −986:−961 | −958:−933 | −932:−907 | −905:−880 |
| RU25 | RU26 | RU27 | RU28 |
| −878:−853 | −852:−827 | −824:−799 | −798:−773 |
| RU29 | RU30 | RU31 | RU32 |
| −770:−745 | −744:−719 | −716:−691 | −690:−665 |
| RU33 | RU34 | RU35 | RU36 |
| −663:−638 | −636:−611 | −610:−585 | −582:−557 |
| RU37 | RU38 | RU39 | RU40 |
| −556:−531 | −527:−502 | −499:−474 | −473:−448 |
| RU41 | RU42 | RU43 | RU44 |
| −445:−420 | −419:−394 | −392:−367 | −365:−340 |
| RU45 | RU46 | RU47 | RU48 |
| −339:−314 | −311:−286 | −285:−260 | −257:−232 |
| RU49 | RU50 | RU51 | RU52 |
| −231:−206 | −203:−178 | −177:−152 | −150:−125 |
| RU53 | RU54 | RU55 | RU56 |
| −123:−98 | −97:−72 | −69:−44 | −43:−18 |
| RU57 | | | |
| −16:−4, 4:16 | | | |

RU 58 to RU 113→Subcarrier indices for RU 57+x are the same as subcarrier indices for RU 57−x multiplied by −1 (x is a positive integer that is less than or equal to 56)

→Ex) Subcarrier indices for RU 58 are the same as subcarriers indices for RU 56 multiplied by −1, that is, 18:43

Null subcarriers: ±{17, 70, 71, 124, 151, 204, 205, 258, 259, 312, 313, 366, 393, 446, 447, 500, 501, 528, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524}

<52 RU>

TABLE 19

| RU1 | RU2 | RU3 | RU4 |
|---|---|---|---|
| −1522:−1471 | −1468:−1417 | −1388:−1337 | −1334:−1283 |
| RU5 | RU6 | RU7 | RU8 |
| −1280:−1229 | −1226:−1175 | −1146:−1095 | −1092:−1041 |
| RU9 | RU10 | RU11 | RU12 |
| −1012:−961 | −958:−907 | −878:−827 | −824:−773 |
| RU13 | RU14 | RU15 | RU16 |
| −770:−719 | −716:−665 | −636:−585 | −582:−531 |
| RU17 | RU18 | RU19 | RU20 |
| −499:−448 | −445:−394 | −365:−314 | −311:−260 |
| RU21 | RU22 | RU23 | RU24 |
| −257:−206 | −203:−152 | −123:−72 | −69:−18 |

RU 25 to RU 48→Subcarrier indices for RU 24+x are the same as subcarrier indices for RU 25−x multiplied by −1 (x is a positive integer that is less than or equal to 24)

→Ex) Subcarrier indices for RU 26 are the same as subcarriers indices for RU 23 multiplied by −1, that is, 72:123

Null subcarriers: ±{17, 70, 71, 124, 151, 204, 205, 258, 259, 312, 313, 366, 393, 446, 447, 500, 501, 528, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524}

<106 RU>

TABLE 20

| RU1 | RU2 | RU3 | RU4 |
|---|---|---|---|
| −1522:−1417 | −1388:−1283 | −1280:−1175 | −1146:−1041 |
| RU5 | RU6 | RU7 | RU8 |
| −1012:−907 | −878:−773 | −770:−665 | −636:−531 |
| RU9 | RU10 | RU11 | RU12 |
| −499:−394 | −365:−260 | −257:−152 | −123:−18 |

RU 13 to RU 24→Subcarrier indices for RU 12+x are the same as subcarrier indices for RU 13−x multiplied by −1 (x is a positive integer that is less than or equal to 12)

→Ex) Subcarrier indices for RU 14 are the same as subcarriers indices for RU 11 multiplied by −1, that is, 152:257

Null subcarriers: ±{17, 124, 151, 258, 259, 366, 393, 500, 501, 528, 529, 530, 637, 664, 771, 772, 879, 906, 1013, 1040, 1147, 1174, 1281, 1282, 1389, 1416, 1523, 1524}

<242 RU>

TABLE 21

| RU1 | RU2 | RU3 | RU4 |
|---|---|---|---|
| −1523:−1282 | −1281:−1040 | −1013:−772 | −771:−530 |
| RU5 | RU6 | | |
| −500:−259 | −258:−17 | | |

RU 7 to RU 12→Subcarrier indices for RU 6+x are the same as subcarrier indices for RU 7−x multiplied by −1 (x is a positive integer that is less than or equal to 6)

→Ex) Subcarrier indices for RU 8 are the same as subcarriers indices for RU 5 multiplied by −1, that is, 259:500

Null subcarriers: ±{501, 528, 529, 1524}

<484 RU>

TABLE 22

| RU1 | RU2 | RU3 |
|---|---|---|
| −1523:−1040 | −1013:−530 | −500:−17 |

RU 5 to RU 8→Subcarrier indices for RU 3+x are the same as subcarrier indices for RU 4−x multiplied by −1 (x is a positive integer that is less than or equal to 3)

→Ex) Subcarrier indices for RU 5 are the same as subcarriers indices for RU 2 multiplied by −1, that is, 530:1013

Null subcarriers: ±{501, 528, 529, 1524}

<996 RU>

TABLE 23

| RU1 | RU2 | RU3 |
|---|---|---|
| −1524:−529 | −500:−3, 3:500 | 529:1524 |

Null subcarriers: ±{501, 528}<3044 or 3042RU>
3044RU: −1524:−3, 3:1524
3042RU: −1524:−4, 4:1524
Null subcarriers: X
Pilot subcarrier indices according to the above tone plans are listed below.

<26 RU>
±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 644, 658, 670, 684, 696, 710, 724, 738, 750, 764, 778, 792, 804, 818, 832, 846, 858, 872, 886, 900, 912, 926, 938, 952, 966, 980, 992, 1006, 1020, 1034, 1046, 1060, 1072, 1086, 1100, 1114, 1126, 1140, 1154, 1168, 1180, 1194, 1206, 1220, 1234, 1248, 1260, 1274, 1288, 1302, 1314, 1328, 1342, 1356, 1368, 1382, 1396, 1410, 1422, 1436, 1448, 1462, 1476, 1490, 1502, 1516}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516}

<106/242/484 RU>
±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1046, 1072, 1114, 1140, 1180, 1206, 1248, 1274, 1288, 1314, 1356, 1382, 1422, 1448, 1490, 1516}

<996 RU/Full Band>
P996v1: ±{24, 92, 158, 226, 266, 334, 400, 468, 562, 630, 696, 764, 804, 872, 938, 1006, 1072, 1140, 1206, 1274, 1314, 1382, 1448, 1516}
P3044v1: ±{24, 92, 158, 226, 266, 334, 400, 468, 562, 630, 696, 764, 804, 872, 938, 1006, 1072, 1140, 1206, 1274, 1314, 1382, 1448, 1516}
P3044v2: ±{92, 226, 334, 468, 630, 764, 872, 1006, 1140, 1274, 1382, 1516}
P3044v3: ±{24, 158, 266, 400, 562, 696, 804, 938, 1072, 1206, 1314, 1448}
P996v2: ±{24, 92, 158, 226, 266, 334, 400, 468, 536, 604, 670, 738, 778, 846, 912, 980, 1046, 1114, 1180, 1248, 1288, 1356, 1422, 1490}

P3044v1: ±{24, 92, 158, 226, 266, 334, 400, 468, 536, 604, 670, 738, 778, 846, 912, 980, 1046, 1114, 1180, 1248, 1288, 1356, 1422, 1490}

P3044v2: ±{92, 226, 334, 468, 604, 738, 846, 980, 1114, 1248, 1356, 1490}

P3044v3: ±{24, 158, 266, 400, 536, 670, 778, 912, 1046, 1180, 1288, 1422}

P996v3: ±{24, 92, 158, 226, 266, 334, 400, 468, 536, 604, 670, 738, 778, 846, 912, 980, 1072, 1140, 1206, 1274, 1314, 1382, 1448, 1516}

P3044v1: ±{24, 92, 158, 226, 266, 334, 400, 468, 536, 604, 670, 738, 778, 846, 912, 980, 1072, 1140, 1206, 1274, 1314, 1382, 1448, 1516}

P3044v2: ±{92, 226, 334, 468, 604, 738, 846, 980, 1140, 1274, 1382, 1516}

P3044v3: ±{24, 158, 266, 400, 536, 670, 778, 912, 1072, 1206, 1314, 1448}

P996v4: ±{24, 92, 158, 226, 266, 334, 400, 468, 562, 630, 696, 764, 804, 872, 938, 1006, 1046, 1114, 1180, 1248, 1288, 1356, 1422, 1490}

P3044v1: ±{24, 92, 158, 226, 266, 334, 400, 468, 562, 630, 696, 764, 804, 872, 938, 1006, 1046, 1114, 1180, 1248, 1288, 1356, 1422, 1490}

P3044v2: ±{92, 226, 334, 468, 630, 764, 872, 1006, 1114, 1248, 1356, 1490}

P3044v3: ±{24, 158, 266, 400, 562, 696, 804, 938, 1046, 1180, 1288, 1422}

Tone Plan 2

When the full band is used, a new RU may be proposed in consideration of a guard tone and a DC tone. In existing 11ax 80 MHz and 160 MHz, 12 right guard tones and 11 left guard tones are used, and 14 right guard tones and 13 left guard tones may be used in 240 MHz in order to further reduce the impact of interference in/from an adjacent channel. Further, it is needed to use DC tones in number equal to or greater than the number of DC tones used in existing 80 MHz, which is five or seven, and five or seven DC tones may be used in consideration of a DC offset. Accordingly, the following tone plans may be proposed. In the following tone plans, G denotes a guard tone, and N denotes a null tone.

2. Alternative 240 MHz Tone Plan 2

<Full Band Tone Plan>

14/13 guard, DC 5 or 7, RU 3040 or 3038

<OFDMA Tone Plan>

14G+996RU+26RU+996RU (5DC)+26RU+996RU+13G

Either 996RU=484RU+1N+26RU+1N+484RU (ver1) (or 1N+484RU+26RU+484RU+1N (ver2))

Middle 996RU (5DC)=484RU+13RU+7DC+13RU+484RU (same as in 80 MHz)

484RU=242RU+242RU

242RU=1N+106RU+1N+26RU+1N+106RU+1N

106RU=52RU+2N+52RU

52RU=26RU+26RU

In the full band, five or seven DC tones are configured in consideration of the impact of a DC offset. The number of DC tones cannot be less than that in 80 MHz/160 MHz and may not be greater than seven in OFDMA.

The two options of the configuration of either 996 RU may be considered to secure the performance of the 26 RU or performance of the 484 RU. The configurations of the middle 996 RU and the remaining RUs are the same as those in existing ax.

Two configurations may be proposed for either 996 RU, among which a first configuration has a null tone disposed on either side of a 26 RU to reduce the impact of interference from/in an adjacent RU, and a second configuration can reduce the impact of interference between a 484 RU and an RU adjacent thereto. An RU using a small number of subcarriers, such as a 26 RU, may preferably use the first configuration since interference significantly affects performance.

The middle 996 RU may employ the same 996 RU tone plan as in existing 80 MHz.

Further, the 484/242/106/52 RUs may employ the same configurations as in existing 11ax.

Listed below are tone indices for each RU and null tone indices in a case where the first configuration is used for either 996 RU.

<26 RU>

| RU1 | RU2 | RU3 | RU4 |
|---|---|---|---|
| −1521:−1496 | −1495:−1470 | −1467:−1442 | −1441:−1416 |
| RU5 | RU6 | RU7 | RU8 |
| −1414:−1389 | −1387:−1362 | −1361:−1336 | −1333:−1308 |
| RU9 | RU10 | RU11 | RU12 |
| −1307:−1282 | −1279:−1254 | −1253:−1228 | −1225:−1200 |
| RU13 | RU14 | RU15 | RU16 |
| −1199:−1174 | −1172:−1147 | −1145:−1120 | −1119:−1094 |
| RU17 | RU18 | RU19 | RU20 |
| −1091:−1066 | −1065:−1040 | −1037:−1012 | −1009:−984 |
| RU21 | RU2 | RU23 | RU24 |
| −983:−958 | −955:−930 | −929:−904 | −902:−877 |
| RU25 | RU26 | RU27 | RU28 |
| −875:−850 | −849:−824 | −821:−796 | −795:−770 |
| RU29 | RU30 | RU31 | RU32 |
| −767:−742 | −741:−716 | −713:−688 | −687:−662 |
| RU33 | RU34 | RU35 | RU36 |
| −660:−635 | −633:−608 | −607:−582 | −579:−554 |
| RU37 | RU38 | RU39 | RU40 |
| −553:−528 | −526:−501 | −499:−474 | −473:−448 |
| RU41 | RU42 | RU43 | RU44 |
| −445:−420 | −419:−394 | −392:−367 | −365:−340 |
| RU45 | RU46 | RU47 | RU48 |
| −339:−314 | −311:−286 | −285:−260 | −257:−232 |
| RU49 | RU50 | RU51 | RU52 |
| −231:−206 | −203:−178 | −177:−152 | −150:−125 |
| RU53 | RU54 | RU55 | RU56 |
| −123:−98 | −97:−72 | −69:−44 | −43:−18 |
| RU57 | | | |
| −16:−4, 4:16 | | | |

RU 58 to RU 113→Subcarrier indices for RU 57+x are the same as subcarrier indices for RU 57−x multiplied by −1 (x is a positive integer that is less than or equal to 56)

→Ex) Subcarrier indices for RU 58 are the same as subcarriers indices for RU 56 multiplied by −1, that is, 18:43

Null subcarriers: ±{17, 70, 71, 124, 151, 204, 205, 258, 259, 312, 313, 366, 393, 446, 447, 500, 527, 580, 581, 634, 661, 714, 715, 768, 769, 822, 823, 876, 903, 956, 957, 1010, 1011, 1038, 1039, 1092, 1093, 1146, 1173, 1226, 1227, 1280, 1281, 1334, 1335, 1388, 1415, 1468, 1469, 1522}

<52 RU>

TABLE 25

| RU1 | RU2 | RU3 | RU4 |
|---|---|---|---|
| −1521−1470 | −1467:−1416 | −1387:−1336 | −1333:−1282 |
| RU5 | RU6 | RU7 | RU8 |
| −1279:−1228 | −1225:−1174 | −1145:−1094 | −1091:−1040 |
| RU9 | RU10 | RU11 | RU12 |
| −1009:−958 | −955:−904 | −875:−824 | −821:−770 |
| RU13 | RU14 | RU15 | RU16 |
| −767:−716 | −713:−662 | −633:−582 | −579:−528 |
| RU17 | RU18 | RU19 | RU20 |
| −499:−448 | −445:−394 | −365:−314 | −311:−260 |
| RU21 | RU22 | RU23 | RU24 |
| −257:−206 | −203:−152 | −123:−72 | −69:−18 |

RU 25 to RU 48→Subcarrier indices for RU 24+x are the same as subcarrier indices for RU 25−x multiplied by −1 (x is a positive integer that is less than or equal to 24)

→Ex) Subcarrier indices for RU 26 are the same as subcarriers indices for RU 23 multiplied by −1, that is, 72:123

Null subcarriers: ±{17, 70, 71, 124, 151, 204, 205, 258, 259, 312, 313, 366, 393, 446, 447, 500, 527, 580, 581, 634, 661, 714, 715, 768, 769, 822, 823, 876, 903, 956, 957, 1010, 1011, 1038, 1039, 1092, 1093, 1146, 1173, 1226, 1227, 1280, 1281, 1334, 1335, 1388, 1415, 1468, 1469, 1522}

<106 RU>

TABLE 26

| RU1 | RU2 | RU3 | RU4 |
| --- | --- | --- | --- |
| −1521:−1416 | −1387:−1282 | −1279:−1174 | −1145:−1040 |
| RU5 | RU6 | RU7 | RU8 |
| −1009:−904 | −875:−770 | −767:−662 | −633:−528 |
| RU9 | RU10 | RU11 | RU12 |
| −499:−394 | −365:−260 | −257:−152 | −123:−18 |

RU 13 to RU 24→Subcarrier indices for RU 12+x are the same as subcarrier indices for RU 13−x multiplied by −1 (x is a positive integer that is less than or equal to 12)

→Ex) Subcarrier indices for RU 14 are the same as subcarriers indices for RU 11 multiplied by −1, that is, 152:257

Null subcarriers: ±{17, 124, 151, 258, 259, 366, 393, 500, 527, 634, 661, 768, 769, 876, 903, 1010, 1011, 1038, 1039, 1146, 1173, 1280, 1281, 1388, 1415, 1522}

<242 RU>

TABLE 27

| RU1 | RU2 | RU3 | RU4 |
| --- | --- | --- | --- |
| −1522:−1281 | −1280:−1039 | −1010:−769 | −768:−527 |
| RU5 | RU6 | | |
| −500:−259 | −258:−17 | | |

RU 7 to RU 12→Subcarrier indices for RU 6+x are the same as subcarrier indices for RU 7−x multiplied by −1 (x is a positive integer that is less than or equal to 6)

→Ex) Subcarrier indices for RU 8 are the same as subcarriers indices for RU 5 multiplied by −1, that is, 259:500

Null subcarriers: ±{1011, 1038}

<484 RU>

TABLE 28

| RU1 | RU2 | RU3 |
| --- | --- | --- |
| −1522:−1039 | −1010:−527 | −500:−17 |

RU 5 to RU 8→Subcarrier indices for RU 3+x are the same as subcarrier indices for RU 4−x multiplied by −1 (x is a positive integer that is less than or equal to 3)

→Ex) Subcarrier indices for RU 5 are the same as subcarriers indices for RU 2 multiplied by −1, that is, 527:1010

Null subcarriers: ±{1011, 1038}

<996 RU>

TABLE 29

| RU1 | RU2 | RU3 |
| --- | --- | --- |
| −1522:−527 | −500:−3, 3:500 | 527:1522 |

Null subcarriers: X<3040 or 3038RU>
3040RU: −1522:−3, 3:1522
3038RU: −1522:−4, 4:1522
Null subcarriers: X Pilot subcarrier indices according to the above tone plans are listed below.

<26 RU>

±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 506, 520, 534, 548, 560, 574, 588, 602, 614, 628, 640, 654, 668, 682, 694, 708, 722, 736, 748, 762, 776, 790, 802, 816, 830, 844, 856, 870, 882, 896, 910, 924, 936, 950, 964, 978, 990, 1004, 1018, 1032, 1046, 1060, 1072, 1086, 1100, 1114, 1126, 1140, 1152, 1166, 1180, 1194, 1206, 1220, 1234, 1248, 1260, 1274, 1288, 1302, 1314, 1328, 1342, 1356, 1368, 1382, 1394, 1408, 1422, 1436, 1448, 1462, 1476, 1490, 1502, 1516}

<52 RU>

±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1046, 1060, 1072, 1086, 1100, 1114, 1126, 1140, 1180, 1194, 1206, 1220, 1234, 1248, 1260, 1274, 1288, 1302, 1314, 1328, 1342, 1356, 1368, 1382, 1422, 1436, 1448, 1462, 1476, 1490, 1502, 1516}

<106/242/484 RU>

±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004, 1046, 1072, 1114, 1140, 1180, 1206, 1248, 1274, 1288, 1314, 1356, 1382, 1422, 1448, 1490, 1516}

<996 RU/Full Band>

P996v1: ±{24, 92, 158, 226, 266, 334, 400, 468, 560, 628, 694, 762, 802, 870, 936, 1004, 1072, 1140, 1206, 1274, 1314, 1382, 1448, 1516}

P3044v1: ±{24, 92, 158, 226, 266, 334, 400, 468, 560, 628, 694, 762, 802, 870, 936, 1004, 1072, 1140, 1206, 1274, 1314, 1382, 1448, 1516}

P3044v2: ±{92, 226, 334, 468, 628, 762, 870, 1004, 1140, 1274, 1382, 1516}

P3044v3: ±{24, 158, 266, 400, 560, 694, 802, 936, 1072, 1206, 1314, 1448}

P996v2: ±{24, 92, 158, 226, 266, 334, 400, 468, 534, 602, 668, 736, 776, 844, 910, 978, 1046, 1114, 1180, 1248, 1288, 1356, 1422, 1490}

P3044v1: ±{24, 92, 158, 226, 266, 334, 400, 468, 534, 602, 668, 736, 776, 844, 910, 978, 1046, 1114, 1180, 1248, 1288, 1356, 1422, 1490}

P3044v2: ±{92, 226, 334, 468, 602, 736, 844, 978, 1114, 1248, 1356, 1490}

P3044v3: ±{24, 158, 266, 400, 534, 668, 776, 910, 1046, 1180, 1288, 1422}

P996v3: ±{24, 92, 158, 226, 266, 334, 400, 468, 534, 602, 668, 736, 776, 844, 910, 978, 1072, 1140, 1206, 1274, 1314, 1382, 1448, 1516}

P3044v1: ±{24, 92, 158, 226, 266, 334, 400, 468, 534, 602, 668, 736, 776, 844, 910, 978, 1072, 1140, 1206, 1274, 1314, 1382, 1448, 1516}

P3044v2: ±{92, 226, 334, 468, 602, 736, 844, 978, 1140, 1274, 1382, 1516}

P3044v3: ±{24, 158, 266, 400, 534, 668, 776, 910, 1072, 1206, 1314, 1448}

P996v4: ±{24, 92, 158, 226, 266, 334, 400, 468, 560, 628, 694, 762, 802, 870, 936, 1004, 1046, 1114, 1180, 1248, 1288, 1356, 1422, 1490}

P3044v1: ±{24, 92, 158, 226, 266, 334, 400, 468, 560, 628, 694, 762, 802, 870, 936, 1004, 1046, 1114, 1180, 1248, 1288, 1356, 1422, 1490}

P3044v2: ±{92, 226, 334, 468, 628, 762, 870, 1004, 1114, 1248, 1356, 1490}

P3044v3: ±{24, 158, 266, 400, 560, 694, 802, 936, 1046, 1180, 1288, 1422}

Listed below are tone indices for each RU and null tone indices in a case where the second configuration is used for either 996 RU.

<26 RU>

TABLE 30

| RU1 | RU2 | RU3 | RU4 |
| --- | --- | --- | --- |
| −1520:−1495 | −1494:−1469 | −1466:−1441 | −1440:−1415 |
| RU5 | RU6 | RU7 | RU8 |
| −1413:−1388 | −1386:−1361 | −1360:−1335 | −1332:−1307 |
| RU9 | RU10 | RU11 | RU12 |
| −1306:−1281 | −1278:−1253 | −1252:−1227 | −1224:−1199 |
| RU13 | RU14 | RU15 | RU16 |
| −1198:−1173 | −1171:−1146 | −1144:−1119 | −1118:−1093 |
| RU17 | RU18 | RU19 | RU20 |
| −1090:−1065 | −1064:−1039 | −1037:−1012 | −1010:−985 |
| RU21 | RU2 | RU23 | RU24 |
| −984:−959 | −956:−931 | −930:−905 | −903:−878 |
| RU25 | RU26 | RU27 | RU28 |
| −876:−851 | −850:−825 | −822:−797 | −796:−771 |
| RU29 | RU30 | RU31 | RU32 |
| −768:−743 | −742:−717 | −714:−689 | −688:−663 |
| RU33 | RU34 | RU35 | RU36 |
| −661:−636 | −634:−609 | −608:−583 | −580:−555 |
| RU37 | RU38 | RU39 | RU40 |
| −554:−529 | −526:−501 | −499:−474 | −473:−448 |
| RU41 | RU42 | RU43 | RU44 |
| −445:−420 | −419:−394 | −392:−367 | −365:−340 |
| RU45 | RU46 | RU47 | RU48 |
| −339:−314 | −311:−286 | −285:−260 | −257:−232 |
| RU49 | RU50 | RU51 | RU52 |
| −231:−206 | −203:−178 | −177:−152 | −150:−125 |
| RU53 | RU54 | RU55 | RU56 |
| −123:−98 | −97:−72 | −69:−44 | −43:−18 |
| RU57 | | | |
| −16:−4,4:16 | | | |

RU 58 to RU 113→Subcarrier indices for RU 57+x are the same as subcarrier indices for RU 57−x multiplied by −1 (x is a positive integer that is less than or equal to 56)

→Ex) Subcarrier indices for RU 58 are the same as subcarriers indices for RU 56 multiplied by −1, that is, 18:43

Null subcarriers: ±{17, 70, 71, 124, 151, 204, 205, 258, 259, 312, 313, 366, 393, 446, 447, 500, 527, 528, 581, 582, 635, 662, 715, 716, 769, 770, 823, 824, 877, 904, 957, 958, 1011, 1038, 1091, 1092, 1145, 1172, 1225, 1226, 1279, 1280, 1333, 1334, 1387, 1414, 1467, 1468, 1521, 1522}

<52 RU>

TABLE 31

| RU1 | RU2 | RU3 | RU4 |
| --- | --- | --- | --- |
| −1520:−1469 | −1466:−1415 | −1386:−1335 | −1332:−1281 |
| RU5 | RU6 | RU7 | RU8 |
| −1278:−1227 | −1224:−1173 | −1144:−1093 | −1090:−1039 |
| RU9 | RU10 | RU11 | RU12 |
| −1010:−959 | −956:−905 | −876:−825 | −822:−771 |
| RU13 | RU14 | RU15 | RU16 |
| −768:−717 | −714:−663 | −634:−583 | −580:−529 |
| RU17 | RU18 | RU19 | RU20 |
| −499:−448 | −445:−394 | −365:−314 | −311:−260 |
| RU21 | RU22 | RU23 | RU24 |
| −257:−206 | −203:−152 | −123:−72 | −69:−18 |

RU 25 to RU 48→Subcarrier indices for RU 24+x are the same as subcarrier indices for RU 25−x multiplied by −1 (x is a positive integer that is less than or equal to 24)

→Ex) Subcarrier indices for RU 26 are the same as subcarriers indices for RU 23 multiplied by −1, that is, 72:123

Null subcarriers: ±{17, 70, 71, 124, 151, 204, 205, 258, 259, 312, 313, 366, 393, 446, 447, 500, 527, 528, 581, 582, 635, 662, 715, 716, 769, 770, 823, 824, 877, 904, 957, 958, 1011, 1038, 1091, 1092, 1145, 1172, 1225, 1226, 1279, 1280, 1333, 1334, 1387, 1414, 1467, 1468, 1521, 1522}

<106 RU>

TABLE 32

| RU1 | RU2 | RU3 | RU4 |
| --- | --- | --- | --- |
| −1520:−1415 | −1386:−1281 | −1278:−1173 | −1144:−1039 |
| RU5 | RU6 | RU7 | RU8 |
| −1010:−905 | −876:−771 | −768:−663 | −634:−529 |
| RU9 | RU10 | RU11 | RU12 |
| −499:−394 | −365:−260 | −257:−152 | −123:−18 |

RU 13 to RU 24→Subcarrier indices for RU 12+x are the same as subcarrier indices for RU 13−x multiplied by −1 (x is a positive integer that is less than or equal to 12)

→Ex) Subcarrier indices for RU 14 are the same as subcarriers indices for RU 11 multiplied by −1, that is, 152:257

Null subcarriers: ±{17, 124, 151, 258, 259, 366, 393, 500, 527, 528, 635, 662, 769, 770, 877, 904, 1011, 1038, 1145, 1172, 1279, 1280, 1387, 1414, 1521, 1522}

<242 RU>

TABLE 33

| RU1 | RU2 | RU3 | RU4 |
| --- | --- | --- | --- |
| −1521:−1280 | −1279:−1038 | −1011:−770 | −769:−528 |
| RU5 | RU6 | | |
| −500:−259 | −258:−17 | | |

RU 7 to RU 12→Subcarrier indices for RU 6+x are the same as subcarrier indices for RU 7−x multiplied by −1 (x is a positive integer that is less than or equal to 6)

→Ex) Subcarrier indices for RU 8 are the same as subcarriers indices for RU 5 multiplied by −1, that is, 259:500

Null subcarriers: ±{527, 1522}

<484 RU>

TABLE 34

| RU1 | RU2 | RU3 |
| --- | --- | --- |
| −1521:−1038 | −1011:−528 | −500:−17 |

RU 5 to RU 8→Subcarrier indices for RU 3+x are the same as subcarrier indices for RU 4−x multiplied by −1 (x is a positive integer that is less than or equal to 3)

→Ex) Subcarrier indices for RU 5 are the same as subcarriers indices for RU 2 multiplied by −1, that is, 528:1011

Null subcarriers: ±{527, 1522}

<996 RU>

TABLE 35

| RU1 | RU2 | RU3 |
| --- | --- | --- |
| −1522:−527 | −500:−3, 3:500 | 527:1522 |

Null subcarriers: X<3040 or 3038RU>
3040RU: −1522:−3, 3:1522
3038RU: −1522:−4, 4:1522
Null subcarriers: X
Pilot subcarrier indices according to the above tone plans are listed below.

<26 RU>
±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 506, 520, 534, 548, 560, 574, 588, 602, 614, 628, 642, 656, 668, 682, 694, 708, 722, 736, 748, 762, 776, 790, 802, 816, 830, 844, 856, 870, 884, 898, 910, 924, 936, 950, 964, 978, 990, 1004, 1018, 1032, 1044, 1058, 1070, 1084, 1098, 1112, 1124, 1138, 1152, 1166, 1178, 1192, 1204, 1218, 1232, 1246, 1258, 1272, 1286, 1300, 1312, 1326, 1340, 1354, 1366, 1380, 1394, 1408, 1420, 1434, 1446, 1460, 1474, 1488, 1500, 1514}

<52 RU>
±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 534, 548, 560, 574, 588, 602, 614, 628, 668, 682, 694, 708, 722, 736, 748, 762, 776, 790, 802, 816, 830, 844, 856, 870, 910, 924, 936, 950, 964, 978, 990, 1004, 1044, 1058, 1070, 1084, 1098, 1112, 1124, 1138, 1178, 1192, 1204, 1218, 1232, 1246, 1258, 1272, 1286, 1300, 1312, 1326, 1340, 1354, 1366, 1380, 1420, 1434, 1446, 1460, 1474, 1488, 1500, 1514}

<106/242/484 RU>
±{24, 50, 92, 118, 158, 184, 226, 252, 266, 292, 334, 360, 400, 426, 468, 494, 534, 560, 602, 628, 668, 694, 736, 762, 776, 802, 844, 870, 910, 936, 978, 1004, 1044, 1070, 1112, 1138, 1178, 1204, 1246, 1272, 1286, 1312, 1354, 1380, 1420, 1446, 1488, 1514}

<996 RU/Full Band>
P996v1: ±{24, 92, 158, 226, 266, 334, 400, 468, 560, 628, 694, 762, 802, 870, 936, 1004, 1070, 1138, 1204, 1272, 1312, 1380, 1446, 1514}
P3044v1: ±{24, 92, 158, 226, 266, 334, 400, 468, 560, 628, 694, 762, 802, 870, 936, 1004, 1070, 1138, 1204, 1272, 1312, 1380, 1446, 1514}
P3044v2: ±{92, 226, 334, 468, 628, 762, 870, 1004, 1138, 1272, 1380, 1514}
P3044v3: ±{24, 158, 266, 400, 560, 694, 802, 936, 1070, 1204, 1312, 1446}
P996v2: ±{24, 92, 158, 226, 266, 334, 400, 468, 534, 602, 668, 736, 776, 844, 910, 978, 1044, 1112, 1178, 1246, 1286, 1354, 1420, 1488}
P3044v1: ±{24, 92, 158, 226, 266, 334, 400, 468, 534, 602, 668, 736, 776, 844, 910, 978, 1044, 1112, 1178, 1246, 1286, 1354, 1420, 1488}
P3044v2: ±{92, 226, 334, 468, 602, 736, 844, 978, 1112, 1246, 1354, 1488}
P3044v3: ±{24, 158, 266, 400, 534, 668, 776, 910, 1044, 1178, 1286, 1420}
P996v3: ±{24, 92, 158, 226, 266, 334, 400, 468, 534, 602, 668, 736, 776, 844, 910, 978, 1070, 1138, 1204, 1272, 1312, 1380, 1446, 1514}
P3044v1: ±{24, 92, 158, 226, 266, 334, 400, 468, 534, 602, 668, 736, 776, 844, 910, 978, 1070, 1138, 1204, 1272, 1312, 1380, 1446, 1514}
P3044v2: ±{92, 226, 334, 468, 602, 736, 844, 978, 1138, 1272, 1380, 1514}
P3044v3: ±{24, 158, 266, 400, 534, 668, 776, 910, 1070, 1204, 1312, 1446}
P996v4: ±{24, 92, 158, 226, 266, 334, 400, 468, 560, 628, 694, 762, 802, 870, 936, 1004, 1044, 1112, 1178, 1246, 1286, 1354, 1420, 1488}
P3044v1: ±{24, 92, 158, 226, 266, 334, 400, 468, 560, 628, 694, 762, 802, 870, 936, 1004, 1044, 1112, 1178, 1246, 1286, 1354, 1420, 1488}
P3044v2: ±{92, 226, 334, 468, 628, 762, 870, 1004, 1112, 1246, 1354, 1488}
P3044v3: ±{24, 158, 266, 400, 560, 694, 802, 936, 1044, 1178, 1286, 1420}

2. Specific Embodiments

Hereinafter, the foregoing tone plans and pilot tone configurations will be described in detail with reference to FIG. 13 to FIG. 17.

Figure 13:
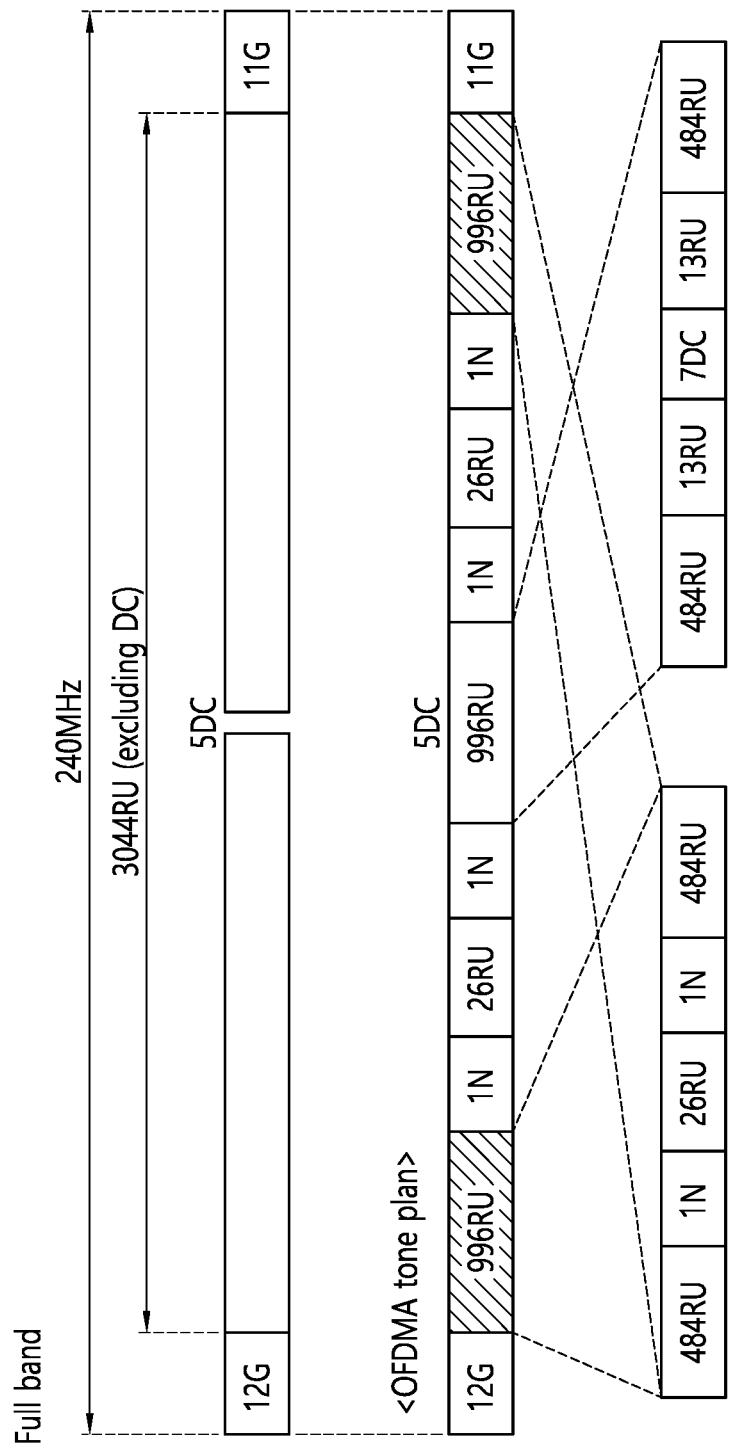
FIG. 13 illustrates an example of a tone plan in a 240 MHz band according to an embodiment.

FIG. 13 illustrates an example of a tone plan in a 240 MHz band according to an embodiment.

FIG. 13 shows both the full band tone plan and the OFDMA tone plan proposed in tone plan 1.

First, in the full band, the 240 MHz tone plan may include 12 guard tones, a 3044 RU, five DC tones, and 11 guard tones in order. The five DC tones may be disposed in the middle of the 240 MHz band, and data may be transmitted via the 3044 RU. However, FIG. 13 shows only one embodiment, and the positions of the 12 guard tones and the 11 guard tones may be changed. Further, when seven DC tones are disposed in the middle of the 240 MHz band, data may be transmitted via a 3042 RU.

When OFDMA is applied, the 240 MHz tone plan may include 12 guard tones, a 996 RU, one null tone, a 26 RU, one null tone, a 996 RU, five DC tones, one null tone, a 26 RU, one null tone, a 996 RU, and 11 guard tones in order.

The 996 RU at either end may include a 484 RU, one null tone, a 26 RU, one null tone, and a 484 RU. The 996RU in the middle may include a 484 RU, a 13 RU, seven DC tones, a 13 RU, and a 484 RU. However, FIG. 13 show only one embodiment, and the positions of the 12 guard tones and the 11 guard tones may be changed, and the 996 RU at either end may include one null tone, a 484 RU, a 26 RU, a 484 RU, and one null tone.

The 484 RU and the other RUs may have the same configurations as in existing 11ax and thus are not shown.

When the OFDMA tone plan is applied to the 240 MHz band, pilot tone indices for the 996 RU at either end of the 240 MHz band may be set to ±{24, 92, 158, 226, 266, 334, 400, 468, 536, 604, 670, 738, 778, 846, 912, 980, 1074, 1142, 1208, 1276, 1316, 1384, 1450, 1518}.

When the full band tone plan is applied to the 240 MHz band, pilot tone indices may be set to ±{24, 158, 266, 400, 536, 670, 778, 912, 1074, 1208, 1316, 1450}.

The foregoing pilot tone indices are presented only for illustration, and various pilot tone indices may be set in view of CFO estimation.

Figure 14:
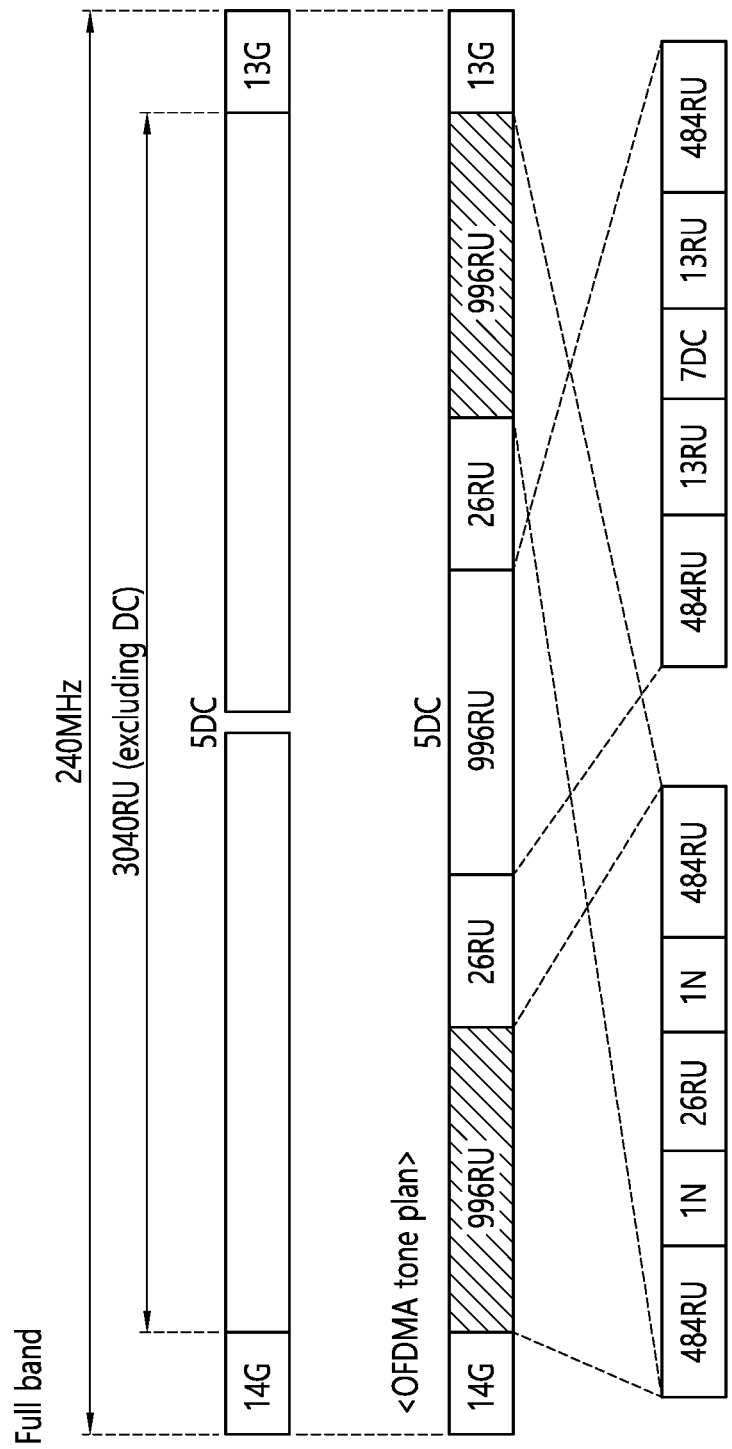
FIG. 14 illustrates another example of a tone plan in a 240 MHz band according to an embodiment.

FIG. 14 illustrates another example of a tone plan in a 240 MHz band according to an embodiment.

FIG. 14 shows both the full band tone plan and the OFDMA tone plan proposed in tone plan 2.

First, in the full band, the 240 MHz tone plan may include 14 guard tones, a 3040 RU, five DC tones, and 13 guard tones in order. The five DC tones may be disposed in the middle of the 240 MHz band, and data may be transmitted via the 3004 RU. However, FIG. 14 shows only one embodiment, and the positions of the 14 guard tones and the 13 guard tones may be changed. Further, when seven DC tones are disposed in the middle of the 240 MHz band, data may be transmitted via a 3038 RU.

When OFDMA is applied, the 240 MHz tone plan may include 14 guard tones, a 996 RU, a 26 RU, a 996 RU, five DC tones, a 26 RU, a 996 RU, and 13 guard tones in order.

The 996 RU at either end may include a 484 RU, one null tone, a 26 RU, one null tone, and a 484 RU. The 996RU in the middle may include a 484 RU, a 13 RU, seven DC tones, a 13 RU, and a 484 RU.

However, FIG. 14 show only one embodiment, and the positions of the 14 guard tones and the 13 guard tones may be changed, and the 996 RU at either end may include one null tone, a 484 RU, a 26 RU, a 484 RU, and one null tone.

The 484 RU and the other RUs may have the same configurations as in existing 11ax and thus are not shown.

When the OFDMA tone plan is applied to the 240 MHz band, pilot tone indices for the 996 RU at either end of the 240 MHz band may be set to ±{24, 92, 158, 226, 266, 334, 400, 468, 534, 602, 668, 736, 776, 844, 910, 978, 1072, 1140, 1206, 1274, 1314, 1382, 1448, 1516}.

When the full band tone plan is applied to the 240 MHz band, pilot tone indices may be set to ±{24, 158, 266, 400, 534, 668, 776, 910, 1072, 1206, 1314, 1448}.

The foregoing pilot tone indices are presented only for illustration, and various pilot tone indices may be set in view of CFO estimation.

Figure 15:
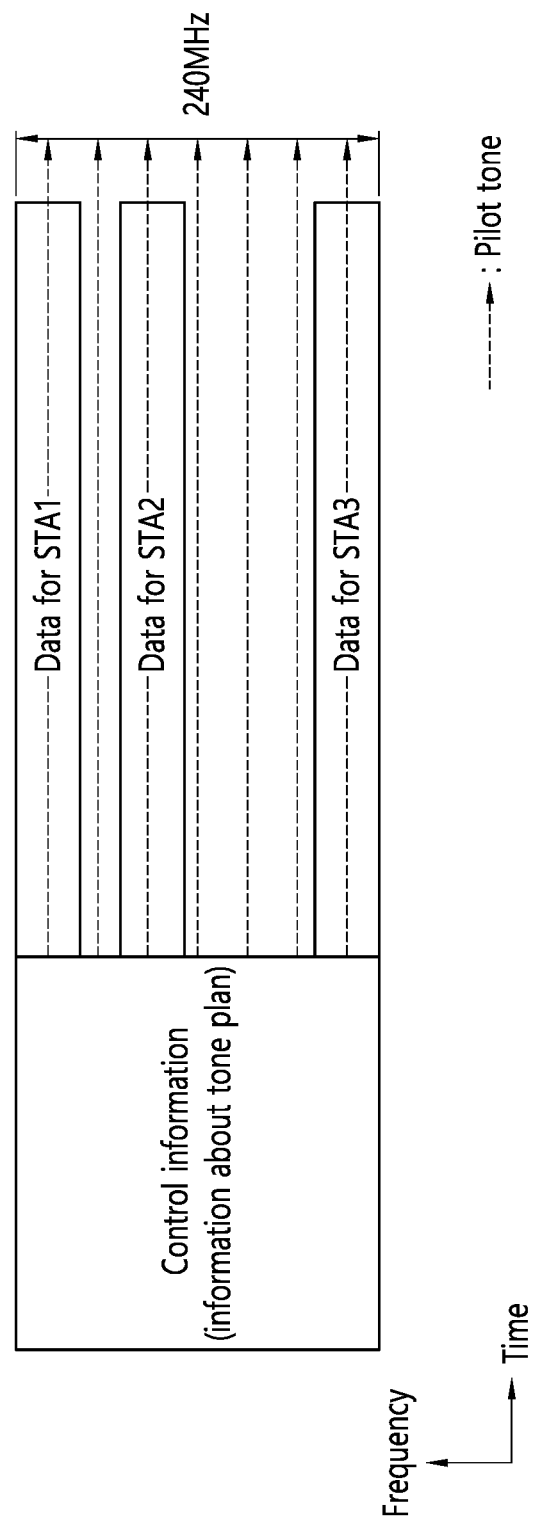
FIG. 15 illustrates an example of OFDMA transmission in a 240 MHz band according to an embodiment.

FIG. 15 illustrates an example of OFDMA transmission in a 240 MHz band according to an embodiment.

Referring to FIG. 15, an AP may transmit a PPDU to STA 1 to STA 3.

The PPDU may include control information including information about a tone plan. STA 1 to STA 3 may transmit or receive data in RUs based on the information about the tone plan in the 240 MHz band.

That is, the AP may transmit the information about the tone plan to all STAs in a BSS in the 240 MHz band, and the STAs may obtain scheduling information about data thereof based on the information about the tone plan. Accordingly, STA 1 to STA 3 having data among all the STAs within the BSS may transmit or receive data through an allocated RU based on the information about the tone plan. The data may include both downlink data and uplink data.

The AP may generate a pilot tone and may transmit the pilot tone to STA 1 to STA 3. The position of the pilot tone may be set based on an OFDMA tone plan or a full band tone plan. Upon receiving the pilot tone, STA 1 to STA 3 may perform channel estimation in the 240 MHz band based on the pilot tone.

Configuring a tone plan and a pilot tone in a wideband will be described in detail with reference to FIG. 16 and FIG. 17.

Figure 16:
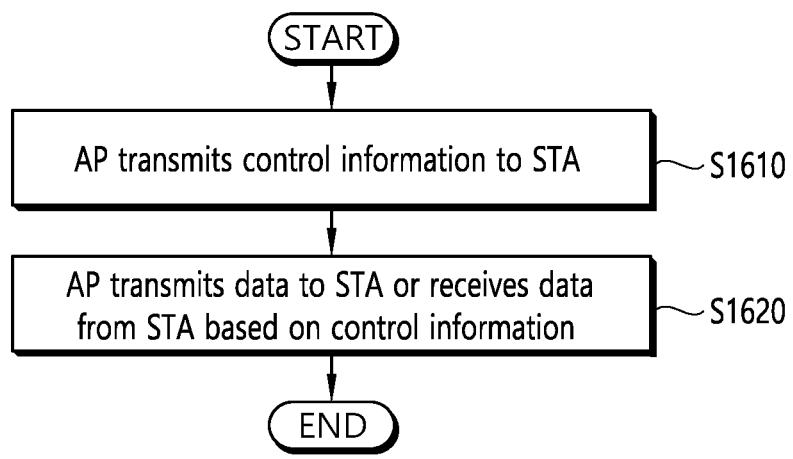
FIG. 16 is a flowchart illustrating a procedure of transmitting/receiving data, based on a tone plan, from an AP perspective according to the present embodiment.

FIG. 16 is a flowchart illustrating a procedure for an AP to transmit and receive data based on a tone plan according to an embodiment.

The embodiment of FIG. 16 may be performed in a network environment supporting a next-generation WLAN system. The next-generation WLAN system may be a WLAN system evolving from an 802.11ax system and may satisfy backward compatibility with the 802.11ax system.

The embodiment of FIG. 16 may be performed by a transmission device, and the transmission device may correspond to an AP. In FIG. 16, a reception device may correspond to a STA (non-AP STA).

In operation S1610, the access point (AP) transmits control information to a station (STA).

In operation S1620, the AP transmits data to the STA or receives data from the STA based on the control information.

The control information includes resource unit (RU) information for transmitting and receiving the data in a broadband. That is, the RU information may be considered to include scheduling information about the data for the STA (information about an RU configuration used for actual data transmission in the broadband). The STA may decode the RU information and may transmit or receive the data in RUs. The broadband may be 160 MHz, 240 MHz, or 320 MHz but is limited to 240 MHz in this embodiment.

When the broadband is defined as only a single full bandwidth based on the RU information, the RU information includes allocation information on that the broadband includes 12 guard tones, a 3044-tone RU, five DC tones, and 11 guard tones. That is, the RU information is tone plan information about the full bandwidth of the broadband. The allocation information is an example, and the RU information may include allocation information about various RU configurations for actually transmitting data. When a tone plan for the full bandwidth of the broadband is used, SU transmission may be performed, and when MU MIMO is applied to the full bandwidth, MU transmission may be performed.

When the broadband includes three 996-tone RUs based on the RU information, the RU information includes allocation information on that the broadband includes 12 guard tones, a first 996-tone RU, one null tone, a 26-tone RU, one null tone, a second 996-tone RU, one null tone, a 26-tone RU, one null tone, a third 996-tone RU, and 11 guard tones. That is, the RU information is tone plan information on that orthogonal frequency division multiple access (OFDMA) is applied to the broadband. The allocation information is an example, and the RU information may include allocation information about various RU configurations for actually transmitting data. When a tone plan in which OFDMA is applied to the broadband is used, the STA is one or more STAs (SU transmission or MU transmission).

When the RU information is the tone plan information about the full bandwidth of the broadband, a tone plan for the broadband is as follows. The broadband may sequentially include 12 guard tones, a 3044-tone RU, five DC tones, and 11 guard tones. The five DC tones may be disposed in the middle of the broadband.

The 3044-tone RU is an RU including 3044 tones. Tone indices for the 3044-tone RU are −1524 to −3 and 3 to 1524. The data may be transmitted or received through the 3044-tone RU.

When the RU information is the tone plan information on that OFDMA is applied to the broadband, a tone plan for the broadband is as follows. The broadband may sequentially include 12 guard tones, a first 996-tone RU, one null tone, a 26-tone RU, one null tone, a second 996-tone RU, one null tone, a 26-tone RU, one null tone, a third 996-tone RU, and 11 guard tones.

The first to third 996-tone RUs are RUs including 996 tones. The first and third 996-tone RUs may be allocated on both ends of the broadband, and the second 996-tone RU may be allocated in the middle of the broadband.

The first and third 996-tone RUs may include a 484-tone RU, one null tone, a 26-tone RU, one null tone, and a 484-tone RU. The second 996-tone RU may include a 484-tone RU, a 13-tone RU, seven DC tones, a 13-tone RU, and a 484-tone RU.

The 484-tone RU is an RU including 484 tones. The 484-tone RU may include a 242-tone RU and a 242-tone RU.

The 242-tone RU is an RU including 242 tones. The 242-tone RU may include one null tone, a 106-tone RU, one null tone, a 26-tone RU, one null tone, a 106-tone RU, and one null tone.

The 106-tone RU is an RU including 106 tones. The 106-tone RU may include a 52-tone RU, one null tone, and a 52-tone RU.

The 52-tone RU is an RU including 52 tones. The 52-tone RU may include a 26-tone RU and a 26-tone RU. The 26-tone RU may be an RU in a minimum unit including 26 tones.

In the tone plan in which OFDMA is applied to the broadband, the data may be transmitted or received through the first to third 996-tone RUs, the 484-tone RU, the 242-tone RU, the 106-tone RU, the 52-tone RU, or the 26-tone RU. That is, the data may be transmitted or received through the 996-tone RU or an RU (the 484-tone RU, the 242-tone RU, the 106-tone RU, the 52-tone RU, or the 26-tone RU) having a smaller number of tones than included in the 996-tone RU.

The AP may generate a physical protocol data unit (PPDU).

The PPDU may include a legacy preamble, an extremely high throughput (EHT)-signal (SIG)-A, an EHT-SIG-B, an EHT-LTF, an EHT-short training field (STF), and a data field. The EHT-SIG-B may include the RU information. That is, the AP may indicate information about a tone plan for the broadband through the EHT-SIG-B in the PPDU.

The data field includes a pilot tone. A specific pilot sequence may be inserted into the pilot tone.

The pilot tone is configured based on the RU information.

A specific operation of generating the PPDU is described as follows. First, the AP may configure the PPDU in the order of the legacy preamble, the EHT-SIG-A, the EHT-SIG-B, the EHT-STF, the EHT-LTF, and the data field. The AP may configure the RU information in the EHT-SIG-B and may configure the pilot tone. The AP may insert the specific pilot sequence into the pilot tone and may transmit the pilot tone to the STA.

When the broadband includes three 996-tone RUs based on the RU information, an index for the pilot tone may be set to ±{24, 92, 158, 226, 266, 334, 400, 468, 536, 604, 670, 738, 778, 846, 912, 980, 1074, 1142, 1208, 1276, 1316, 1384, 1450, 1518}.

When the broadband is defined as only a single full bandwidth based on the RU information, an index for the pilot tone may be set to ±{24, 158, 266, 400, 536, 670, 778, 912, 1074, 1208, 1316, 1450}.

When the broadband includes six 484-tone RUs, 12 242-tone RUs, or 24 106-tone RUs based on the RU information, an index for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518}.

When the broadband includes 48 52-tone RUs based on the RU information, an index for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518}.

When the broadband includes 96 26-tone RUs based on the RU information, an index for the pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518}.

The index for the pilot tone may be an even number, because 1×/2×LTF is considered When the broadband includes the 96 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the three 996-tone RUs based on the RU information, the pilot tones may be partially selected from pilot tones configured when the broadband includes the six 484-tone RUs. For example, half the pilot tones configured when the broadband includes the six 484-tone RUs may be used by alternately selecting the pilot tones.

When the broadband is defined as only the single full bandwidth based on the RU information, the pilot tones may be partially selected from pilot tones configured when the broadband includes the three 996-tone RUs. For example, half the pilot tones configured when the broadband includes the three 996-tone RUs may be used by alternately selecting the pilot tones.

The EHT-LTF may include the pilot tone. That is, the EHT-STF, the EHT-LTF, and the data field in the PPDU may be transmitted in a band (RU) according to the tone plan for the broadband.

Figure 17:
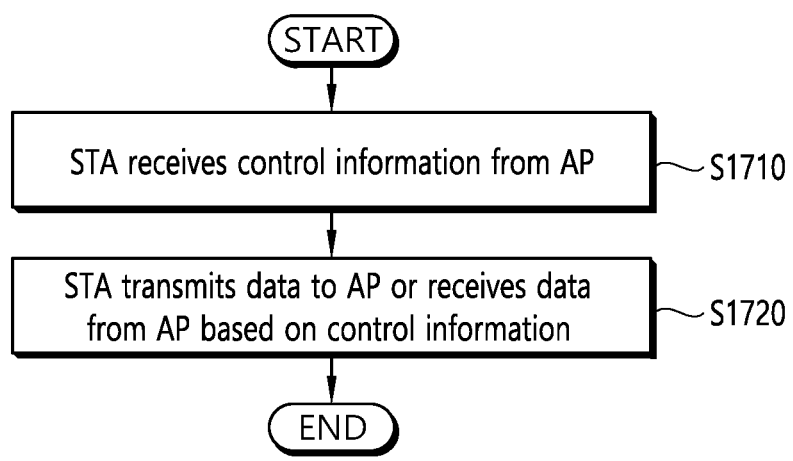
FIG. 17 is a flowchart illustrating a procedure of transmitting/receiving data, based on a tone plan, from an STA perspective according to the present embodiment.

FIG. 17 is a flowchart illustrating a procedure for a STA to transmit and receive data based on a tone plan according to an embodiment.

The embodiment of FIG. 17 may be performed in a network environment supporting a next-generation WLAN system. The next-generation WLAN system may be a WLAN system evolving from an 802.11ax system and may satisfy backward compatibility with the 802.11ax system.

The embodiment of FIG. 17 may be performed by a reception device, and the reception device may correspond to a STA (non-AP STA).

In operation S1710, the station (STA) receives control information from the access point (AP).

In operation 1720, the STA transmits data to the AP or receives data from the AP based on the control information.

The control information includes resource unit (RU) information for transmitting and receiving the data in a broadband. That is, the RU information may be considered to include scheduling information about the data for the STA (information about an RU configuration used for actual data transmission in the broadband). The STA may decode the RU information and may transmit or receive the data in RUs. The broadband may be 160 MHz, 240 MHz, or 320 MHz but is limited to 240 MHz in this embodiment.

When the broadband is defined as only a single full bandwidth based on the RU information, the RU information includes allocation information on that the broadband includes 12 guard tones, a 3044-tone RU, five DC tones, and 11 guard tones. That is, the RU information is tone plan information about the full bandwidth of the broadband. The allocation information is an example, and the RU information may include allocation information about various RU configurations for actually transmitting data. When a tone plan for the full bandwidth of the broadband is used, SU transmission may be performed, and when MU MIMO is applied to the full bandwidth, MU transmission may be performed.

When the broadband includes three 996-tone RUs based on the RU information, the RU information includes allocation information on that the broadband includes 12 guard tones, a first 996-tone RU, one null tone, a 26-tone RU, one null tone, a second 996-tone RU, one null tone, a 26-tone RU, one null tone, a third 996-tone RU, and 11 guard tones. That is, the RU information is tone plan information on that orthogonal frequency division multiple access (OFDMA) is applied to the broadband. The allocation information is an example, and the RU information may include allocation information about various RU configurations for actually transmitting data. When a tone plan in which OFDMA is applied to the broadband is used, the STA is one or more STAs (SU transmission or MU transmission).

When the RU information is the tone plan information about the full bandwidth of the broadband, a tone plan for the broadband is as follows. The broadband may sequentially include 12 guard tones, a 3044-tone RU, five DC tones, and 11 guard tones. The five DC tones may be disposed in the middle of the broadband.

The 3044-tone RU is an RU including 3044 tones. Tone indices for the 3044-tone RU are −1524 to −3 and 3 to 1524. The data may be transmitted or received through the 3044-tone RU.

When the RU information is the tone plan information on that OFDMA is applied to the broadband, a tone plan for the broadband is as follows. The broadband may sequentially include 12 guard tones, a first 996-tone RU, one null tone, a 26-tone RU, one null tone, a second 996-tone RU, one null tone, a 26-tone RU, one null tone, a third 996-tone RU, and 11 guard tones.

The first to third 996-tone RUs are RUs including 996 tones. The first and third 996-tone RUs may be allocated on both ends of the broadband, and the second 996-tone RU may be allocated in the middle of the broadband.

The first and third 996-tone RUs may include a 484-tone RU, one null tone, a 26-tone RU, one null tone, and a 484-tone RU. The second 996-tone RU may include a 484-tone RU, a 13-tone RU, seven DC tones, a 13-tone RU, and a 484-tone RU.

The 484-tone RU is an RU including 484 tones. The 484-tone RU may include a 242-tone RU and a 242-tone RU.

The 242-tone RU is an RU including 242 tones. The 242-tone RU may include one null tone, a 106-tone RU, one null tone, a 26-tone RU, one null tone, a 106-tone RU, and one null tone.

The 106-tone RU is an RU including 106 tones. The 106-tone RU may include a 52-tone RU, one null tone, and a 52-tone RU.

The 52-tone RU is an RU including 52 tones. The 52-tone RU may include a 26-tone RU and a 26-tone RU. The 26-tone RU may be an RU in a minimum unit including 26 tones.

In the tone plan in which OFDMA is applied to the broadband, the data may be transmitted or received through the first to third 996-tone RUs, the 484-tone RU, the 242-tone RU, the 106-tone RU, the 52-tone RU, or the 26-tone RU. That is, the data may be transmitted or received through the 996-tone RU or an RU (the 484-tone RU, the 242-tone RU, the 106-tone RU, the 52-tone RU, or the 26-tone RU) having a smaller number of tones than included in the 996-tone RU.

The STA may receive the control information through a physical protocol data unit (PPDU).

The PPDU may include a legacy preamble, an extremely high throughput (EHT)-signal (SIG)-A, an EHT-SIG-B, an EHT-LTF, an EHT-short training field (STF), and a data field. The EHT-SIG-B may include the RU information. That is, the AP may indicate information about a tone plan for the broadband through the EHT-SIG-B in the PPDU.

The data field includes a pilot tone. A specific pilot sequence may be inserted into the pilot tone.

The pilot tone is configured based on the RU information.

A specific operation of decoding the PPDU is described as follows. First, the AP may configure the PPDU in the order of the legacy preamble, the EHT-SIG-A, the EHT-SIG-B, the EHT-STF, the EHT-LTF, and the data field. The AP may insert the specific pilot sequence into the pilot tone and may transmit the pilot tone to the STA. The STA may perform channel estimation based on a legacy (L)-LTF included in the legacy preamble. The STA may identify the RU information included in the EHT-SIG-B and information about the pilot tone using an estimated channel. The STA may perform channel estimation based on the EHT-LTF. The STA may compensate for a residual carrier frequency offset (CFO) based on the pilot tone when decoding the data field using an estimated channel.

When the broadband includes three 996-tone RUs based on the RU information, an index for the pilot tone may be set to ±{24, 92, 158, 226, 266, 334, 400, 468, 536, 604, 670, 738, 778, 846, 912, 980, 1074, 1142, 1208, 1276, 1316, 1384, 1450, 1518}.

When the broadband is defined as only a single full bandwidth based on the RU information, an index for the pilot tone may be set to ±{24, 158, 266, 400, 536, 670, 778, 912, 1074, 1208, 1316, 1450}.

When the broadband includes six 484-tone RUs, 12 242-tone RUs, or 24 106-tone RUs based on the RU information, an index for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518}.

When the broadband includes 48 52-tone RUs based on the RU information, an index for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518}.

When the broadband includes 96 26-tone RUs based on the RU information, an index for the pilot tone may be set to ±{110, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518}.

The index for the pilot tone may be an even number, because 1×/2×LTF is considered When the broadband includes the 96 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the three 996-tone RUs based on the RU information, the pilot tones may be partially selected from pilot tones configured when the broadband includes the six 484-tone RUs. For example, half the pilot tones configured when the broadband includes the six 484-tone RUs may be used by alternately selecting the pilot tones.

When the broadband is defined as only the single full bandwidth based on the RU information, the pilot tones may be partially selected from pilot tones configured when the broadband includes the three 996-tone RUs. For example, half the pilot tones configured when the broadband includes the three 996-tone RUs may be used by alternately selecting the pilot tones.

The EHT-LTF may include the pilot tone. That is, the EHT-STF, the EHT-LTF, and the data field in the PPDU may be transmitted in a band (RU) according to the tone plan for the broadband.

5. Device Configuration

Figure 18:
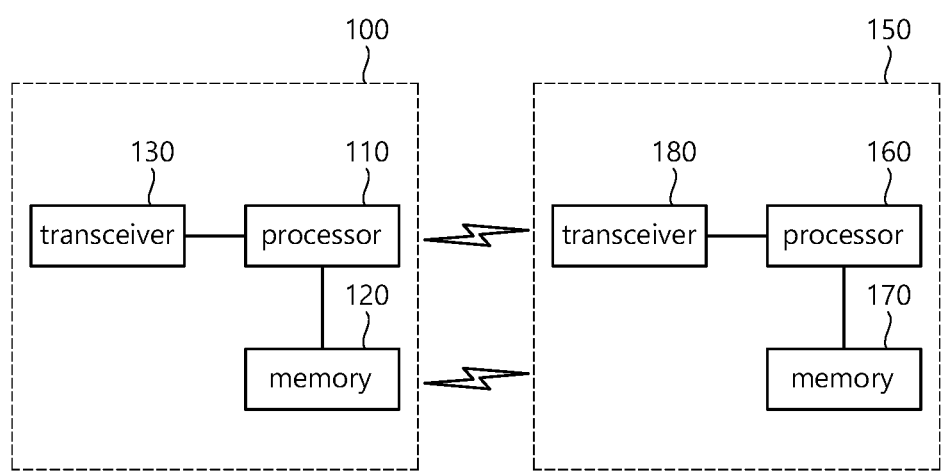
FIG. 18 is a diagram illustrating a device for implementing the above-described method.

FIG. 18 is a diagram illustrating a device for implementing the aforementioned method.

A wireless device (100) of FIG. 18 may correspond to an initiator STA, which transmits a signal that is described in the description presented above, and a wireless device (150) may correspond to a responder STA, which receives a signal that is described in the description presented above. At this point, each station may correspond to a flay device (or user equipment (UE)) or a PCP/AP. Hereinafter, for simplicity in the description of the present disclosure, the initiator STA transmits a signal is referred to as a transmission device (100), and the responder STA receiving a signal is referred to as a reception device (150).

The transmission device (100) may include a processor (110), a memory (120), and a transceiver (130), and the reception device (150) may include a processor (160), a memory (170), and a transceiver (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180).

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

A specific operation of the processor (110) of the transmission device is as follows. The processor (110) of the transmission device transmits control information to a STA and transmits data to the STA or receives data from the STA based on the control information.

A specific operation of the processor (160) of the reception device is as follows. The processor (160) of the reception device receives control information from an AP and transmits data to the AP or receives data from the AP based on the control information.

Figure 19:
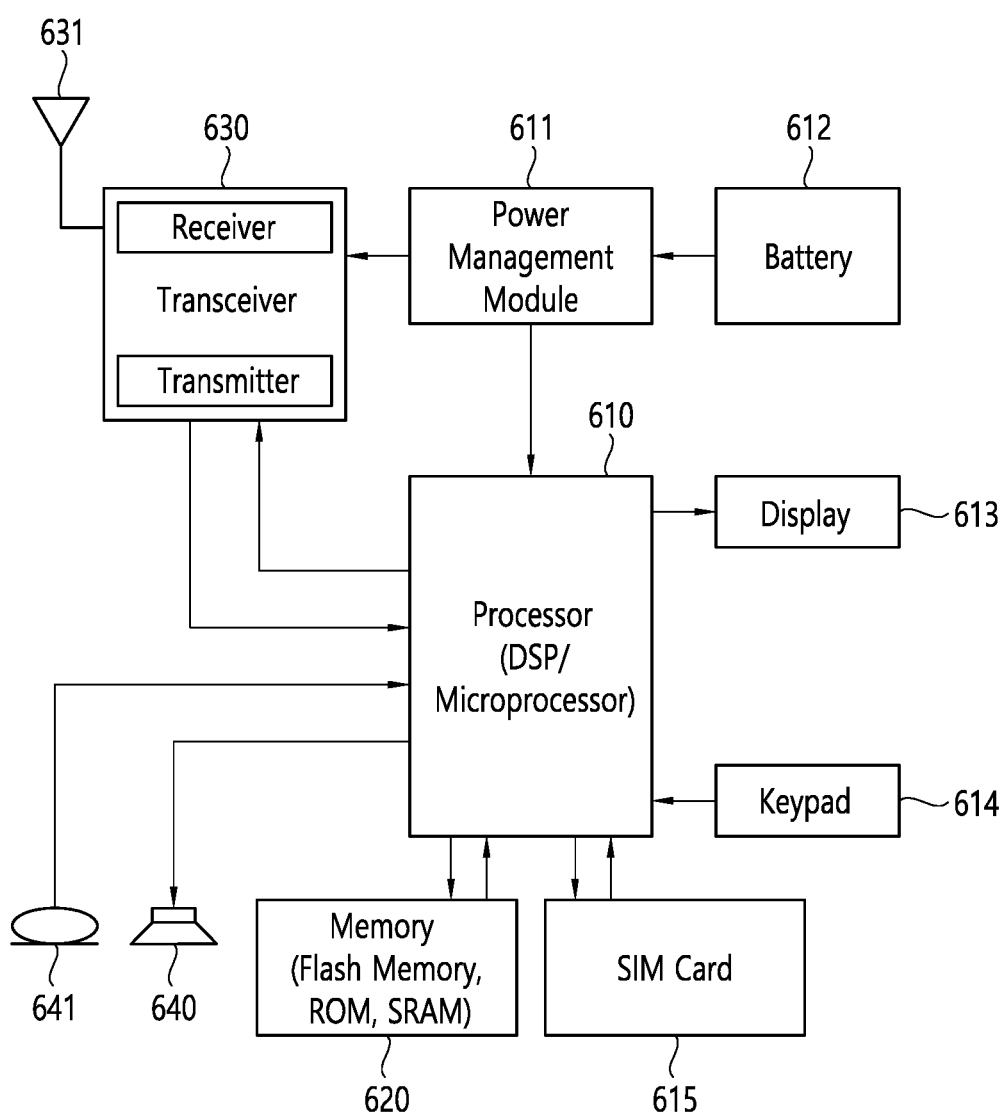
FIG. 19 illustrates a specific wireless device implementing an embodiment of the present disclosure.

FIG. 19 illustrates a specific wireless device to implement an embodiment of the present disclosure. The present disclosure described above for the transmission device or the reception device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this disclosure. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the transmission device, the processor (610) transmits control information to a STA and transmits data to the STA or receives data from the STA based on the control information.

In the reception device, the processor (610) receives control information and transmits data to an AP or receives data from the AP based on the control information.

The control information includes resource unit (RU) information for transmitting and receiving the data in a broadband. That is, the RU information may be considered to include scheduling information about the data for the STA (information about an RU configuration used for actual data transmission in the broadband). The STA may decode the RU information and may transmit or receive the data in RUs. The broadband may be 160 MHz, 240 MHz, or 320 MHz but is limited to 240 MHz in this embodiment.

When the broadband is defined as only a single full bandwidth based on the RU information, the RU information includes allocation information on that the broadband includes 12 guard tones, a 3044-tone RU, five DC tones, and 11 guard tones. That is, the RU information is tone plan information about the full bandwidth of the broadband. The allocation information is an example, and the RU information may include allocation information about various RU configurations for actually transmitting data. When a tone plan for the full bandwidth of the broadband is used, SU transmission may be performed, and when MU MIMO is applied to the full bandwidth, MU transmission may be performed.

When the broadband includes three 996-tone RUs based on the RU information, the RU information includes allocation information on that the broadband includes 12 guard tones, a first 996-tone RU, one null tone, a 26-tone RU, one null tone, a second 996-tone RU, one null tone, a 26-tone RU, one null tone, a third 996-tone RU, and 11 guard tones. That is, the RU information is tone plan information on that orthogonal frequency division multiple access (OFDMA) is applied to the broadband. The allocation information is an example, and the RU information may include allocation information about various RU configurations for actually transmitting data. When a tone plan in which OFDMA is applied to the broadband is used, the STA is one or more STAs (SU transmission or MU transmission).

When the RU information is the tone plan information about the full bandwidth of the broadband, a tone plan for the broadband is as follows. The broadband may sequentially include 12 guard tones, a 3044-tone RU, five DC tones, and 11 guard tones. The five DC tones may be disposed in the middle of the broadband.

The 3044-tone RU is an RU including 3044 tones. Tone indices for the 3044-tone RU are −1524 to −3 and 3 to 1524. The data may be transmitted or received through the 3044-tone RU.

When the RU information is the tone plan information on that OFDMA is applied to the broadband, a tone plan for the broadband is as follows. The broadband may sequentially include 12 guard tones, a first 996-tone RU, one null tone, a 26-tone RU, one null tone, a second 996-tone RU, one null tone, a 26-tone RU, one null tone, a third 996-tone RU, and 11 guard tones.

The first to third 996-tone RUs are RUs including 996 tones. The first and third 996-tone RUs may be allocated on both ends of the broadband, and the second 996-tone RU may be allocated in the middle of the broadband.

The first and third 996-tone RUs may include a 484-tone RU, one null tone, a 26-tone RU, one null tone, and a 484-tone RU. The second 996-tone RU may include a 484-tone RU, a 13-tone RU, seven DC tones, a 13-tone RU, and a 484-tone RU.

The 484-tone RU is an RU including 484 tones. The 484-tone RU may include a 242-tone RU and a 242-tone RU.

The 242-tone RU is an RU including 242 tones. The 242-tone RU may include one null tone, a 106-tone RU, one null tone, a 26-tone RU, one null tone, a 106-tone RU, and one null tone.

The 106-tone RU is an RU including 106 tones. The 106-tone RU may include a 52-tone RU, one null tone, and a 52-tone RU.

The 52-tone RU is an RU including 52 tones. The 52-tone RU may include a 26-tone RU and a 26-tone RU. The 26-tone RU may be an RU in a minimum unit including 26 tones.

In the tone plan in which OFDMA is applied to the broadband, the data may be transmitted or received through the first to third 996-tone RUs, the 484-tone RU, the 242-tone RU, the 106-tone RU, the 52-tone RU, or the 26-tone RU. That is, the data may be transmitted or received through the 996-tone RU or an RU (the 484-tone RU, the 242-tone RU, the 106-tone RU, the 52-tone RU, or the 26-tone RU) having a smaller number of tones than included in the 996-tone RU.

The AP may generate a physical protocol data unit (PPDU).

The PPDU may include a legacy preamble, an extremely high throughput (EHT)-signal (SIG)-A, an EHT-SIG-B, an EHT-LTF, an EHT-short training field (STF), and a data field. The EHT-SIG-B may include the RU information. That is, the AP may indicate information about a tone plan for the broadband through the EHT-SIG-B in the PPDU.

The data field includes a pilot tone. A specific pilot sequence may be inserted into the pilot tone.

The pilot tone is configured based on the RU information.

A specific operation of generating the PPDU is described as follows. First, the AP may configure the PPDU in the order of the legacy preamble, the EHT-SIG-A, the EHT-SIG-B, the EHT-STF, the EHT-LTF, and the data field. The AP may configure the RU information in the EHT-SIG-B and may configure the pilot tone. The AP may insert the specific pilot sequence into the pilot tone and may transmit the pilot tone to the STA.

When the broadband includes three 996-tone RUs based on the RU information, an index for the pilot tone may be set to ±{24, 92, 158, 226, 266, 334, 400, 468, 536, 604, 670, 738, 778, 846, 912, 980, 1074, 1142, 1208, 1276, 1316, 1384, 1450, 1518}.

When the broadband is defined as only a single full bandwidth based on the RU information, an index for the pilot tone may be set to ±{24, 158, 266, 400, 536, 670, 778, 912, 1074, 1208, 1316, 1450}.

When the broadband includes six 484-tone RUs, 12 242-tone RUs, or 24 106-tone RUs based on the RU information, an index for the pilot tone may be set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518}.

When the broadband includes 48 52-tone RUs based on the RU information, an index for the pilot tone may be set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518}.

When the broadband includes 96 26-tone RUs based on the RU information, an index for the pilot tone may be set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518}.

The index for the pilot tone may be an even number, because 1×/2×LTF is considered When the broadband includes the 96 26-tone RUs, one 26-tone RU includes two pilot tones with 26-RU tone indices having the sixth largest absolute value and the seventh smallest absolute value or having the seventh largest absolute value and the seventh smallest absolute value.

For the pilot tone in the 52-tone, 106-tone, 242-tone, and 484-tone RUs, a pilot tone configuration method defined in 802.11ax is equally used.

When the broadband includes the three 996-tone RUs based on the RU information, the pilot tones may be partially selected from pilot tones configured when the broadband includes the six 484-tone RUs. For example, half the pilot tones configured when the broadband includes the six 484-tone RUs may be used by alternately selecting the pilot tones.

When the broadband is defined as only the single full bandwidth based on the RU information, the pilot tones may be partially selected from pilot tones configured when the broadband includes the three 996-tone RUs. For example, half the pilot tones configured when the broadband includes the three 996-tone RUs may be used by alternately selecting the pilot tones.

The EHT-LTF may include the pilot tone. That is, the EHT-STF, the EHT-LTF, and the data field in the PPDU may be transmitted in a band (RU) according to the tone plan for the broadband.

What is claimed is:

1. A method for transmitting and receiving data in a wireless local area network (WLAN) system, the method comprising:
    transmitting, by an access point (AP), control information to a station (STA); and
    transmitting, by the AP, data to the STA or receiving, by the AP, data from the STA based on the control information,
    wherein the control information comprises resource unit (RU) information for transmitting and receiving the data in a broadband,
    the RU information comprises allocation information on that the broadband comprises 12 guard tones, a 3044-tone RU, five DC tones, and 11 guard tones when the broadband is defined as only a single full bandwidth based on the RU information, and
    the RU information comprises allocation information on that the broadband comprises 12 guard tones, a first 996-tone RU, one null tone, a 26-tone RU, one null tone, a second 996-tone RU, one null tone, a 26-tone RU, one null tone, a third 996-tone RU, and 11 guard tones when the broadband comprises three 996-tone RUs based on the RU information.

2. The method of claim 1, wherein the 3044-tone RU is an RU comprising 3044 tones,
    tone indices for the 3044-tone RU are −1524 to −3 and 3 to 1524, and
    the data is transmitted or received through the 3044-tone RU.

3. The method of claim 1, wherein the first to third 996-tone RUs are RUs comprising 996 tones,
    the first and third 996-tone RUs are allocated on both ends of the broadband,
    the second 996-tone RU is allocated in a middle of the broadband,
    the first and third 996-tone RUs comprises a 484-tone RU, one null tone, a 26-tone RU, one null tone, and a 484-tone RU, and
    the second 996-tone RU comprises a 484-tone RU, a 13-tone RU, seven DC tones, a 13-tone RU, and a 484-tone RU.

4. The method of claim 3, wherein the 484-tone RU is an RU comprising 484 tones, and
    the 484-tone RU comprises a 242-tone RU and a 242-tone RU.

5. The method of claim 4, wherein the 242-tone RU is an RU comprising 242 tones, and
    the 242-tone RU comprises one null tone, a 106-tone RU, one null tone, a 26-tone RU, one null tone, a 106-tone RU, and one null tone.

6. The method of claim 5, wherein the 106-tone RU is an RU comprising 106 tones, and
    the 106-tone RU comprises a 52-tone RU, one null tone, and a 52-tone RU.

7. The method of claim 6, wherein the 52-tone RU is an RU comprising 52 tones,
    the 52-tone RU comprises a 26-tone RU and a 26-tone RU, and
    the 26-tone RU is an RU in a minimum unit comprising 26 tones.

8. The method of claim 7, wherein the data is transmitted or received through the first to third 996-tone RUs, the 484-tone RU, the 242-tone RU, the 106-tone RU, the 52-tone RU, or the 26-tone RU.

9. The method of claim 1, comprising:
generating, by the AP, a physical protocol data unit (PPDU),
wherein the PPDU comprises a legacy preamble, an extremely high throughput (EHT)-signal (SIG)-A, an EHT-SIG-B, an EHT-LTF, an EHT-short training field (STF), and a data field,
the broadband is 240 MHz,
the EHT-SIG-B comprises the RU information,
the data field comprises a pilot tone and the data,
the pilot tone is configured based on the RU information,
an index for the pilot tone is set to ±{24, 92, 158, 226, 266, 334, 400, 468, 536, 604, 670, 738, 778, 846, 912, 980, 1074, 1142, 1208, 1276, 1316, 1384, 1450, 1518} when the broadband comprises the three 996-tone RUs based on the RU information, and
an index for the pilot tone is set to ±{24, 158, 266, 400, 536, 670, 778, 912, 1074, 1208, 1316, 1450} when the broadband is defined as only the single full bandwidth based on the RU information.

10. The method of claim 9, wherein an index for the pilot tone is set to ±{24, 50, 92, 118, 158, 184, 226, 252, 266, 292, 334, 360, 400, 426, 468, 494, 536, 562, 604, 630, 670, 696, 738, 764, 778, 804, 846, 872, 912, 938, 980, 1006, 1048, 1074, 1116, 1142, 1182, 1208, 1250, 1276, 1290, 1316, 1358, 1384, 1424, 1450, 1492, 1518} when the broadband comprises six 484-tone RUs, 12 242-tone RUs, or 24 106-tone RUs based on the RU information,
an index for the pilot tone is set to ±{24, 38, 50, 64, 78, 92, 104, 118, 158, 172, 184, 198, 212, 226, 238, 252, 266, 280, 292, 306, 320, 334, 346, 360, 400, 414, 426, 440, 454, 468, 480, 494, 536, 550, 562, 576, 590, 604, 616, 630, 670, 684, 696, 710, 724, 738, 750, 764, 778, 792, 804, 818, 832, 846, 858, 872, 912, 926, 938, 952, 966, 980, 992, 1006, 1048, 1062, 1074, 1088, 1102, 1116, 1128, 1142, 1182, 1196, 1208, 1222, 1236, 1250, 1262, 1276, 1290, 1304, 1316, 1330, 1344, 1358, 1370, 1384, 1424, 1438, 1450, 1464, 1478, 1492, 1504, 1518} when the broadband comprises 48 52-tone RUs based on the RU information,
an index for the pilot tone is set to ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494, 508, 522, 536, 550, 562, 576, 590, 604, 616, 630, 642, 656, 670, 684, 696, 710, 724, 738, 750, 764, 778, 792, 804, 818, 832, 846, 858, 872, 884, 898, 912, 926, 938, 952, 966, 980, 992, 1006, 1020, 1034, 1048, 1062, 1074, 1088, 1102, 1116, 1128, 1142, 1154, 1168, 1182, 1196, 1208, 1222, 1236, 1250, 1262, 1276, 1290, 1304, 1316, 1330, 1344, 1358, 1370, 1384, 1396, 1410, 1424, 1438, 1450, 1464, 1478, 1492, 1504, 1518} when the broadband comprises 96 26-tone RUs based on the RU information, and
the index for the pilot tone is an even number.

11. The method of claim 10, wherein, when the broadband comprises the three 996-tone RUs based on the RU information, the pilot tone is partially selected from pilot tones configured when the broadband comprises the six 484-tone RUs.

12. The method of claim 10, wherein, when the broadband is defined as only the single full bandwidth based on the RU information, the pilot tone is partially selected from pilot tones configured when the broadband comprises the three 996-tone RUs.

13. An access point (AP) for transmitting and receiving data in a wireless local area network (WLAN) system, the AP comprising:
a memory;
a transceiver; and
a processor operatively connected with the memory and the transceiver,
wherein the processor is configured to:
transmit control information to a station (STA) and transmit data to the STA or receive data from the STA based on the control information,
the control information comprises resource unit (RU) information for transmitting and receiving the data in a broadband,
the RU information comprises allocation information on that the broadband comprises 12 guard tones, a 3044-tone RU, five DC tones, and 11 guard tones when the broadband is defined as only a single full bandwidth based on the RU information, and
the RU information comprises allocation information on that the broadband comprises 12 guard tones, a first 996-tone RU, one null tone, a 26-tone RU, one null tone, a second 996-tone RU, one null tone, a 26-tone RU, one null tone, a third 996-tone RU, and 11 guard tones when the broadband comprises three 996-tone RUs based on the RU information.

14. The AP of claim 13, wherein the 3044-tone RU is an RU comprising 3044 tones,
tone indices for the 3044-tone RU are −1524 to −3 and 3 to 1524, and
the data is transmitted or received through the 3044-tone RU.

15. The AP of claim 13, wherein the first to third 996-tone RUs are RUs comprising 996 tones,
the first and third 996-tone RUs are allocated on both ends of the broadband,
the second 996-tone RU is allocated in a middle of the broadband,
the first and third 996-tone RUs comprises a 484-tone RU, one null tone, a 26-tone RU, one null tone, and a 484-tone RU, and
the second 996-tone RU comprises a 484-tone RU, a 13-tone RU, seven DC tones, a 13-tone RU, and a 484-tone RU.

16. The AP of claim 13, wherein the processor is further configured to:
generate a physical protocol data unit (PPDU),
the PPDU comprises a legacy preamble, an extremely high throughput (EHT)-signal (SIG)-A, an EHT-SIG-B, an EHT-LTF, an EHT-short training field (STF), and a data field, the broadband is 240 MHz,
the EHT-SIG-B comprises the RU information,
the data field comprises a pilot tone and the data,
the pilot tone is configured based on the RU information,
an index for the pilot tone is set to ±{24, 92, 158, 226, 266, 334, 400, 468, 536, 604, 670, 738, 778, 846, 912, 980, 1074, 1142, 1208, 1276, 1316, 1384, 1450, 1518} when the broadband comprises the three 996-tone RUs based on the RU information, and
an index for the pilot tone is set to ±{24, 158, 266, 400, 536, 670, 778, 912, 1074, 1208, 1316, 1450} when the broadband is defined as only the single full bandwidth based on the RU information.

17. A method for transmitting and receiving data in a wireless local area network (WLAN) system, the method comprising:

receiving, by a station (STA), control information from an access point (AP); and transmitting, by the STA, data to the AP or receiving, by the STA, data from the AP based on the control information, wherein the control information comprises resource unit (RU) information for transmitting and receiving the data in a broadband, the RU information comprises allocation information on that the broadband comprises 12 guard tones, a 3044-tone RU, five DC tones, and 11 guard tones when the broadband is defined as only a single full bandwidth based on the RU information, and the RU information comprises allocation information on that the broadband comprises 12 guard tones, a first 996-tone RU, one null tone, a 26-tone RU, one null tone, a second 996-tone RU, one null tone, a 26-tone RU, one null tone, a third 996-tone RU, and 11 guard tones when the broadband comprises three 996-tone RUs based on the RU information.

18. The method of claim 17, wherein the 3044-tone RU is an RU comprising 3044 tones, tone indices for the 3044-tone RU are −1524 to −3 and 3 to 1524, and the data is transmitted or received through the 3044-tone RU.

19. The method of claim 17, wherein the first to third 996-tone RUs are RUs comprising 996 tones, the first and third 996-tone RUs are allocated on both ends of the broadband, the second 996-tone RU is allocated in a middle of the broadband, the first and third 996-tone RUs comprises a 484-tone RU, one null tone, a 26-tone RU, one null tone, and a 484-tone RU, and the second 996-tone RU comprises a 484-tone RU, a 13-tone RU, seven DC tones, a 13-tone RU, and a 484-tone RU.

20. The method of claim 17, wherein the control information is received through a physical protocol data unit (PPDU), wherein the PPDU comprises a legacy preamble, an extremely high throughput (EHT)-signal (SIG)-A, an EHT-SIG-B, an EHT-LTF, an EHT-short training field (STF), and a data field, the broadband is 240 MHz, the EHT-SIG-B comprises the RU information, the data field comprises a pilot tone and the data, the pilot tone is configured based on the RU information, an index for the pilot tone is set to ±{24, 92, 158, 226, 266, 334, 400, 468, 536, 604, 670, 738, 778, 846, 912, 980, 1074, 1142, 1208, 1276, 1316, 1384, 1450, 1518} when the broadband comprises the three 996-tone RUs based on the RU information, and an index for the pilot tone is set to ±{24, 158, 266, 400, 536, 670, 778, 912, 1074, 1208, 1316, 1450} when the broadband is defined as only the single full bandwidth based on the RU information.

* * * * *